United States Patent
Brown

[19]

[11] Patent Number: 5,839,614

[45] Date of Patent: Nov. 24, 1998

[54] DISPENSING PACKAGE

[75] Inventor: Paul E. Brown, Midland, Mich.

[73] Assignee: Aptar Group, Inc., Crystal Lake, Ill.

[21] Appl. No.: 508,472

[22] Filed: Jul. 28, 1995

Related U.S. Application Data

[63] Continuation-in-part of Ser. No. 240,264, May 10, 1994, Pat. No. 5,439,143, which is a continuation of Ser. No. 804,086, Dec. 6, 1991, Pat. No. 5,213,236.

[51] Int. Cl.$^6$ ..................................................... B67D 5/06
[52] U.S. Cl. ...................... 222/185; 220/89.1; 220/203; 222/212; 222/490; 222/494
[58] Field of Search ............................. 222/181.2, 185.1, 222/206, 212, 215, 490, 491, 492, 493, 494, 495, 496; 220/89.1, 783, 205

[56] References Cited

U.S. PATENT DOCUMENTS

| | | | |
|---|---|---|---|
| 1,206,661 | 11/1916 | Booth . | |
| 1,825,553 | 9/1931 | Smith . | |
| 1,989,714 | 2/1935 | Statham | 221/60 |
| 2,175,052 | 10/1939 | Bull et al. | 221/60 |
| 2,758,755 | 8/1956 | Schafler | 222/213 |
| 3,342,379 | 9/1967 | Foley | 222/173 |
| 3,490,488 | 1/1970 | Grist | 220/203 |
| 3,921,630 | 11/1975 | McPhee | 222/107 X |
| 4,088,166 | 5/1978 | Miller | 222/107 X |
| 4,166,553 | 9/1979 | Fraterrigo | 222/181 |
| 4,340,054 | 7/1982 | Michaels | 222/105 X |
| 4,408,702 | 10/1983 | Horvath | 222/212 |
| 4,434,810 | 3/1984 | Atkinson | 137/493 |
| 4,470,523 | 9/1984 | Spector | 222/181 |
| 4,728,006 | 3/1988 | Drobish et al. | 222/181 |
| 4,747,519 | 5/1988 | Green et al. | 222/181 |
| 4,749,108 | 6/1988 | Dornsbusch et al. | 222/212 |
| 4,987,740 | 1/1991 | Coleman | 220/203 |
| 5,033,655 | 7/1991 | Brown | 222/212 |
| 5,071,017 | 12/1991 | Stull | 220/203 |
| 5,115,950 | 5/1992 | Rohr | 220/494 |
| 5,203,470 | 4/1993 | Brown | 222/105 X |

FOREIGN PATENT DOCUMENTS

| | | |
|---|---|---|
| 0278125 | 8/1988 | European Pat. Off. . |
| 0395380 | 10/1990 | European Pat. Off. . |
| 996998 | 12/1951 | France . |
| 2128875 | 12/1972 | Germany . |
| 2609310 | 9/1976 | Germany . |
| 3941668 | 4/1991 | Germany . |
| 145824 | 3/1962 | U.S.S.R. . |
| 1046518 | 10/1966 | United Kingdom . |
| 2098958 | 12/1982 | United Kingdom . |

*Primary Examiner*—Joseph Kaufman
*Attorney, Agent, or Firm*—Price, Heneveld, Cooper, DeWitt & Litton

[57] ABSTRACT

A dispensing package is provided for fluid products such as liquid soaps, shampoos and conditioners, household detergents, cleaners, polishes, moisturizing creams, and the like, and includes a container with a self-sealing dispensing valve mounted therein. The valve includes a marginal portion, a head portion with a discharge orifice therein, and a generally J-shaped connector sleeve having one end connected with the marginal portion and the opposite end connected with the head portion. The connector sleeve has a resiliently flexible construction, with first and second leg portions that are oriented at an acute included angle, and join one another at an arcuate base portion to facilitate movement of the head portion of the valve when dispensing product from the container. A top dispense embodiment of the package has an inverted J-shaped configuration at the top of the upper leg, which extends arcuately into the head portion of the valve for dispensing products from the top of the container.

44 Claims, 13 Drawing Sheets

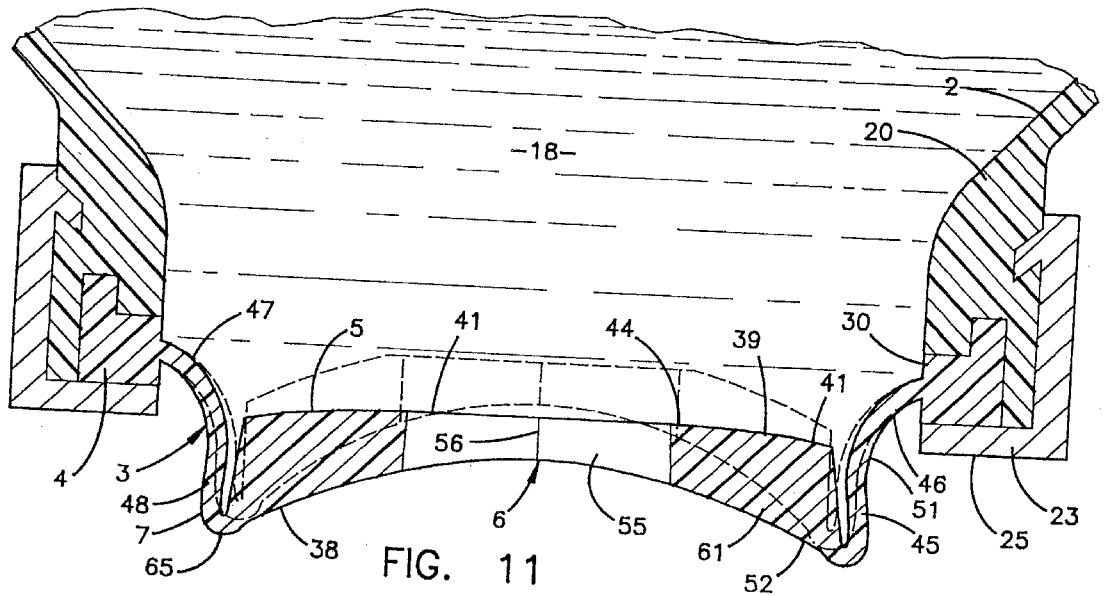
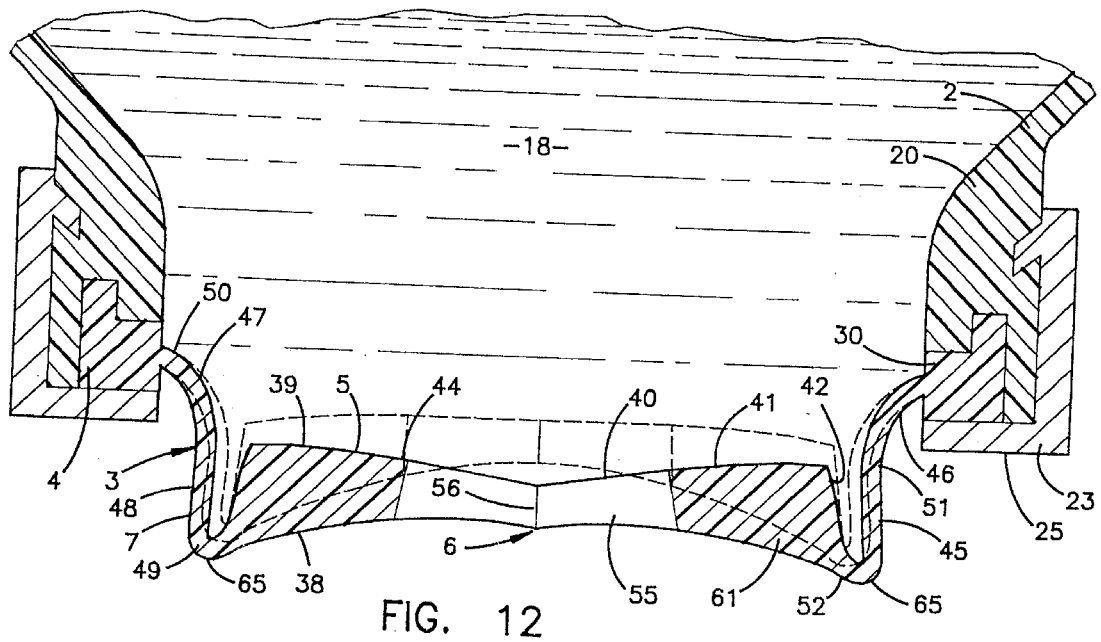

DISPENSING PACKAGE

CROSS-REFERENCES TO RELATED APPLICATIONS

The present application is a continuation-in-part of commonly assigned, co-pending U.S. patent application Ser. No. 08/240,264, filed May 10, 1994 now U.S. Pat. No. 5,439,143, entitled DISPENSING PACKAGE, which is a continuation of Ser. No. 08/804,086, filed Dec. 6, 1991 (now U.S. Pat. No. 5,213,236).

BACKGROUND OF THE INVENTION

The present invention relates to product packaging, and in particular to a self-sealing valve for fluid products, and the like.

Many different types of packages or containers are presently available for packaging non-solid products of the type which are capable of flowing, such as fluid or fluidized materials, including liquids, pastes, powders, and the like, which substances are collectively and generically referred to herein as "fluids". Some such packages include a dispenser which permits a selected amount of fluid to be discharged from the package, and then reseals to close the package.

Self-sealing dispensing valves have been used in packaging for certain types of products, such as the container disclosed in U.S. Pat. No. 4,728,006 to Drobish et al., which is designed for shampoos, conditioners, and the like. However, such valves have been known to experience some types of sealing problems, and inconsistent dispensing characteristics, particularly when the packages are exposed to significant temperature variations.

Valves constructed from most conventional plastic materials cannot be used in at least certain types of packages, since they either react with or adulterate the product. For instance, in food packaging, care must be taken to avoid the use of valve materials which might contain any type of toxin. Furthermore, active ingredients in products can cause the valve to either embrittle or soften, thereby ruining the designed flow rate and/or self-sealing characteristics of the valve.

Liquid silicone rubber valves have recently been used in some types of packaging, and have proven particularly advantageous since the material is inherently quite inert, and will therefore not either adulterate or react with the packaged product. Examples of such packaging are provided in applicant's U.S. Pat. No. 5,033,655 to Brown. Although liquid silicone rubber possesses many attributes for use in packaging, it also has other characteristics which render such applications problematic. For example, the surfaces of liquid silicone rubber parts are extremely tacky or sticky, having a very high coefficient of friction. As a result, in attempting to attach a dispensing valve to a container by a conventional threaded collar arrangement, the surfaces of the valve flange will stick tightly to the adjacent surfaces of the container and collar before the collar can be tightened securely enough to create a leak-resistant seal. Tightening of the collar often causes the valve flange, as well as the entire valve to distort from its designed shape, thereby preventing the formation of a secure seal, and/or changing the intended dispensing and sealing characteristics of the valve.

Another drawback associated with the use of liquid silicone rubber in dispensing valves for product packaging is that there is presently no available adhesive capable of connecting the valve to a container in a manner that will withstand the operating pressures to which the valve and container are repeatedly subjected. The unique imperforate nature of the surfaces of the liquid silicone rubber valve precludes the use of conventional adhesives. Hence, the attachment of the liquid silicone rubber valve to a container in a manner that will not leak, and will withstand repeated pressurization and depressurization of the dispensing package is an important consideration.

Another problem experienced with prior dispensing packages relates to achieving a proper design balance between the package container, valve, and fluid product, so that the product can be repeatedly dispensed without requiring excess force, and will neatly discharge only that amount of product which is desired by the user, particularly in keeping with the type of product involved. For instance, when dispensing highly concentrated fluid products, such as hand soaps, and the like, the user will typically require only a small amount or dollop of soap per application to achieve satisfactory results. In contrast, when using other types of fluid products, such as skin moisturizers, tanning formulas, and the like, larger quantities of product are typically required by the user for each application. The ability of the valve to quickly and readily open in response to moderate pressure on the container is important, as is the ability of the valve to quickly and securely close when the pressure has been released. Also important is the amount of pressure which must be maintained on the container to sustain fluid through the valve once the valve is opened. The ability to quickly and accurately achieve a proper balance between all of these factors is very desirable in designing dispensing packages.

SUMMARY OF THE INVENTION

One aspect of the present invention is a dispensing package and associated valve for fluid products and the like, comprising a container having the dispensing valve mounted therein. The dispensing valve controls the flow of fluid product from the container, and has a marginal portion sealing about a discharge opening of the container. The valve also has a head portion including a central area with an orifice which opens to permit fluid flow therethrough in response to a predetermined discharge pressure within the container, and closes to shut off fluid flow therethrough upon removal of the predetermined discharge pressure. The valve includes a generally J-shaped connector sleeve, having a resiliently flexible construction with a first leg portion thereof connected with the marginal portion, and a second leg portion thereof connected with the head portion. The first and second leg portions are mutually oriented at an acute included angle, and join one another at an arcuate portion which facilitates movement of the head portion of the valve when dispensing product from the container.

Another aspect of the present invention is a dispensing package and associated valve for fluid products and the like, comprising a container having the dispensing valve mounted therein. The dispensing valve controls the flow of fluid product from the container, and has a marginal portion sealing about a discharge opening of the container. The valve has a head portion including a central area with an orifice which opens to permit fluid flow therethrough in response to a predetermined discharge pressure within the container, and closes to shut off fluid flow therethrough upon removal of the predetermined discharge pressure. The valve also has a resiliently flexible connector sleeve, including a first end portion thereof connected with the marginal portion, and a second end portion thereof connected with the head portion. The second end of the connector sleeve has an inverted J-shape which extends arcuately into the head portion to facilitate movement of the head portion of the valve when dispensing product from the container.

Yet another aspect of the present invention is a dispensing package and associated valve for fluid products and the like, comprising a container having the dispensing valve mounted therein. The dispensing valve controls the flow of fluid product from the container, and has a marginal portion sealing about a discharge opening of the container. The valve has a head portion including a central area with an orifice which opens to permit fluid flow therethrough in response to a predetermined discharge pressure within the container, and closes to shut off fluid flow therethrough upon removal of the predetermined discharge pressure. The valve also has a head portion including an exterior surface which interfaces with ambient environment and has a generally concave shape when viewed from outside the container, and interior surface which interfaces with the fluid product in the container and has a central area and a generally inclined outer portion which tapers inwardly toward the center area, such that the exterior and interior surfaces converge toward the central area of the head portion to provide a tapered construction with reduced thickness adjoining the orifice.

Yet another aspect of the present invention is a dispensing package and associated valve for fluid products and the like, comprising a container having the valve mounted therein. The dispensing valve controls the flow of fluid product from the container, and has a marginal portion sealing about a discharge opening of the container. The valve has a head portion including a central area with an orifice which opens to permit fluid flow therethrough in response to a predetermined discharge pressure within the container, and closes to shut off fluid flow therethrough upon removal of the predetermined discharge pressure. The head portion has an exterior surface which interfaces with ambient environment, and an interior surface which interfaces with the fluid product in the container. The exterior and interior surfaces of the head portion taper inwardly toward the center area, such that the exterior and interior surfaces converge toward the central area of the head portion to provide a tapered construction with reduced thickness adjoining the orifice.

The principal objects of the present invention are to provide a dispensing package and an associated self-sealing valve which are capable of easily and neatly dispensing a wide variety of different types of fluid products. The self-sealing valve is matched with both the container and the type of fluid product to be dispensed, so as to quickly and securely seal, yet readily and fully open when the user applies modest pressure to the container. The valve includes a resiliently flexible connector sleeve which is configured to apply a torque to the valve head which assists in opening the orifice. The connector sleeve has sufficient flexibility that pressure increases in the interior of the container, such as those caused by thermal expansion, are offset by shifting the valve head on the connector sleeve, so as to alleviate excess pressure on the orifice. The connector sleeve is also configured to provide sufficient flexibility that any misalignment and/or distortion of the valve flange when attached to the associated container are not transmitted to the valve head, thereby permitting unhindered opening and closing of the orifice. The connector sleeve is also configured to provide sufficient flexibility that shock impact forces, and the like applied to the container are absorbed by shifting the valve head on the connector sleeve, so as to avoid inadvertent opening of the valve orifice. The valve is configured to provide a generally constant flow rate therethrough, even when exposed to a relatively wide range of container pressures. For those products wherein a substantial amount of material is typically dispensed per application, the valve is configured such that once the orifice is shifted open, the amount of pressure required to maintain fluid flow through the orifice is reduced, so as to provide greater ease of operation, without sacrificing secure sealing of the valve. The valve is extremely versatile, and may be used in either top, bottom or side dispensing packages to accommodate a wide variety of different applications. The valve is very durable, while having reduced manufacturing costs, and an uncomplicated design. The overall package is efficient in use, economical to manufacture, capable of a long operating life, and particularly well adapted for many different proposed uses.

These and other advantages of the invention will be further understood and appreciated by those skilled in the art by reference to the following written specification, claims and appended drawings.

BRIEF DESCRIPTION OF THE DRAWINGS

FIG. 11 is an enlarged, cross-sectional view of the valve installed in an associated container, with the valve shown in a fully closed and fully extended position, wherein a valve head portion thereof is shown beginning to snap outwardly.

FIG. 12 is an enlarged, cross-sectional view of the valve installed in an associated container, with the valve shown in a fully closed, and fully extended position, wherein the valve head portion of which is shown continuing to snap outwardly.

DETAILED DESCRIPTION OF THE PREFERRED EMBODIMENTS

Figure 1:
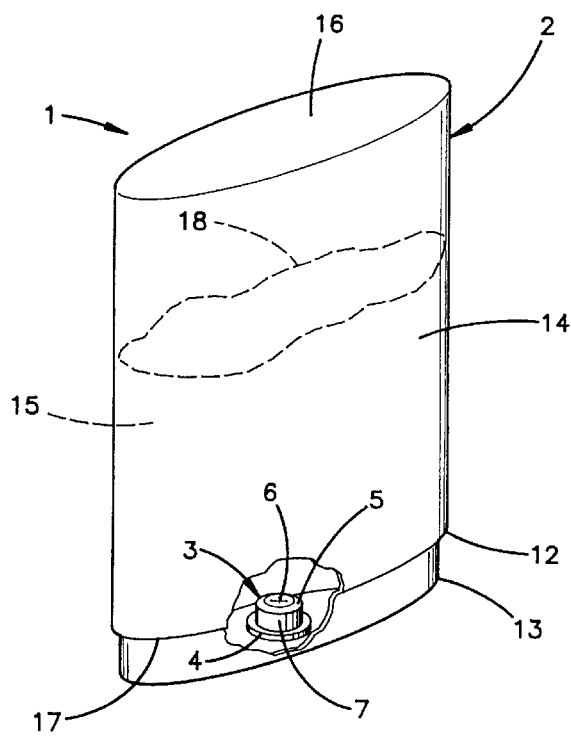
FIG. 1 is a perspective view of a dispensing package embodying the present invention, wherein a portion thereof has been broken away to reveal a self-sealing valve mounted in a bottom portion of an associated container.
Figure 2:
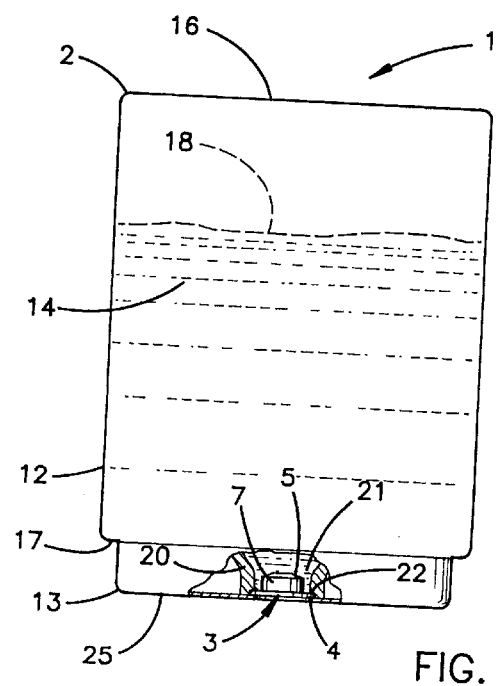
FIG. 2 is a side elevational view of the dispensing package, wherein a portion thereof has been broken away to reveal the valve, which is shown in a fully retracted and fully closed position.
Figure 3:
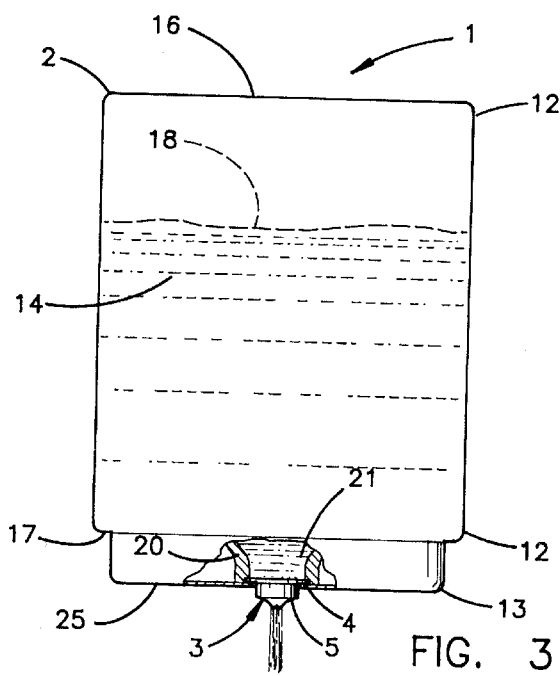
FIG. 3 is a side elevational view of the dispensing package, wherein a portion thereof has been broken away to reveal the valve, which is shown in a fully extended and fully open position.

For purposes of description herein, the terms "upper", "lower", "right", "left", "rear", "front", "vertical", "horizontal", and derivatives thereof shall relate to the invention as oriented in FIGS. 1–3. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a dispensing package embodying the present invention. Dispensing package 1 is particularly adapted for dispensing fluid products, such as liquid soaps, household cleaners, polishes, moisturizing creams, foodstuffs, and the like, and includes a container 2 with a self-sealing dispensing valve 3 mounted therein. Valve 3 includes a marginal flange 4, a valve head 5 with a discharge orifice 6 therein, and a connector sleeve 7, having one end connected with valve flange 4, and the opposite end connected with valve head 5 adjacent a marginal edge thereof. Connector sleeve 7 has a resiliently flexible construction, such that when pressure within container 2 is raised above a predetermined amount, valve head 5 shifts outwardly (FIGS. 8–15) in a manner which causes connector sleeve 7 to double over and then extend rollingly.

The container 2 illustrated in FIGS. 1–3 is particularly designed for bottom dispensing, and includes a generally flexible, oblong container body 12 supported on a substantially rigid base 13. Container body 12 is preferably integrally molded from an appropriate synthetic resin material or the like, so as to create a one-piece construction that includes oppositely oriented sidewalls 14 and 15, a top 16 and a bottom 17. The container sidewalls 14 and 15 are laterally flexible to pressurize and depressurize the interior of container 2, and preferably have sufficient resilience or stiffness that they automatically return to their original shape upon release of any external forces which are applied to container 2 to dispense a fluid product 18 therefrom.

Figure 7:
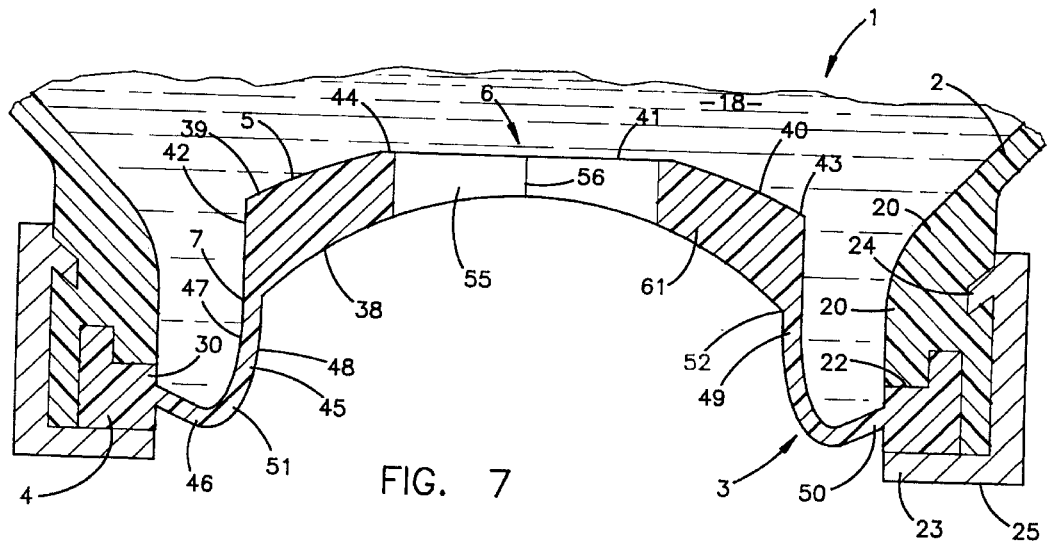
FIG. 7 is an enlarged, cross-sectional view of the valve installed in an associated container, with the valve shown in the fully closed and fully retracted position.
Figure 8:
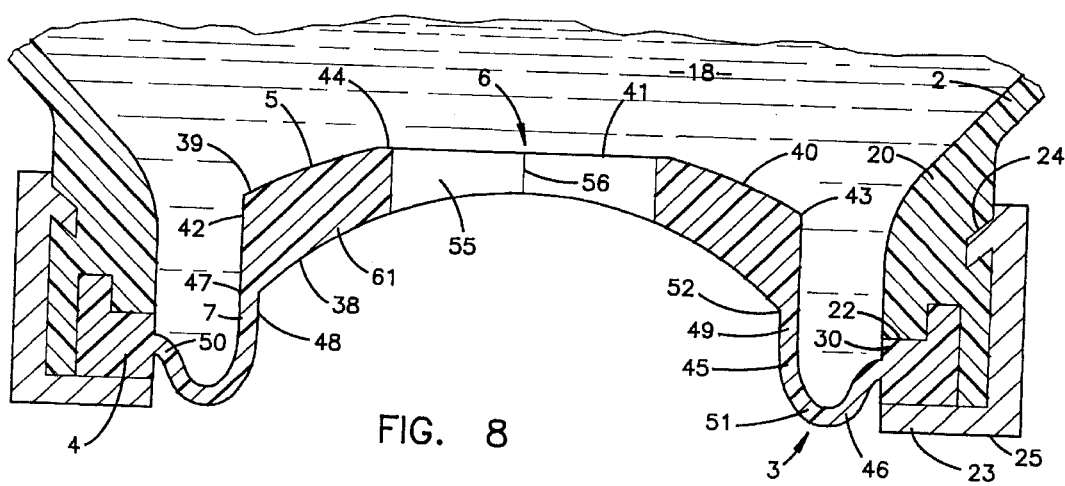
FIG. 8 is an enlarged, cross-sectional view of the valve installed in an associated container, with the valve shown in a fully closed, and partially retracted position.

The container bottom 17 illustrated in FIGS. 2 and 3 includes a downwardly opening neck 20, which defines a discharge opening 21 about which the marginal flange 4 of valve 3 is positioned. As best illustrated in FIG. 7 and 8, the free end of neck 20 includes an annularly shaped groove 22 having a general L-shaped longitudinal cross-sectional configuration, which is shaped to closely receive the marginal flange 4 of valve 3 therein. Container base 13 includes a valve retainer ring 23 positioned adjacent groove 22, and attached to container body 12 by a snap lock arrangement 24. Container base 13 (FIGS. 2 & 3) has a substantially flat bottom 25 adapted to abuttingly support dispensing package 1 on an associated surface, such as a countertop, sink, worksurface, or the like. Neck groove 22 is located inwardly of the bottom 25 of container base 13, so as to position valve 3 in a generally recessed condition within dispensing package 1, as explained in greater detail hereinafter.

Figure 4:
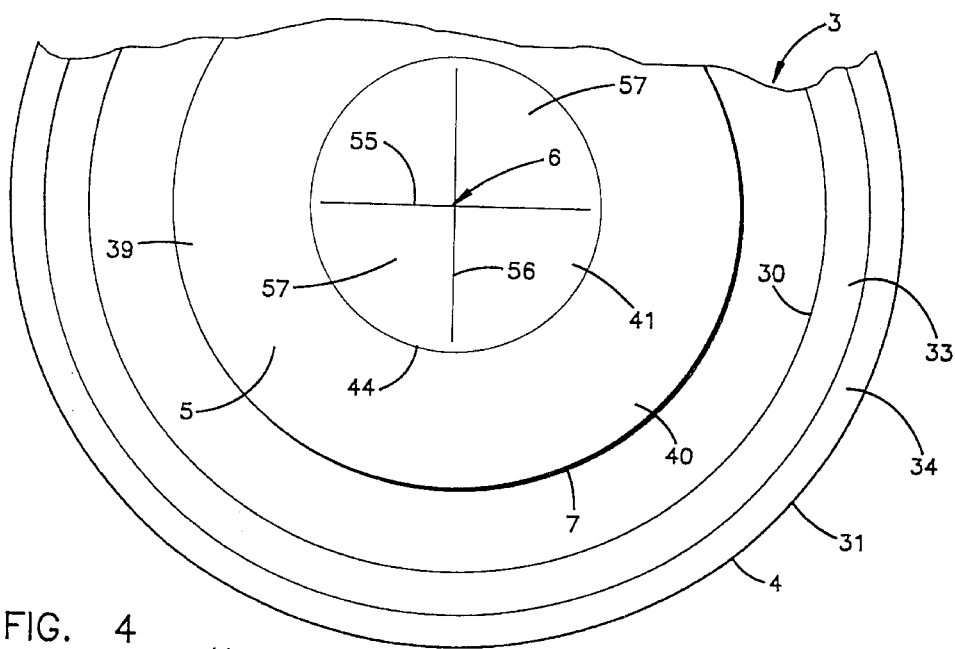
FIG. 4 is an enlarged, fragmentary top view of the valve.
Figure 5:
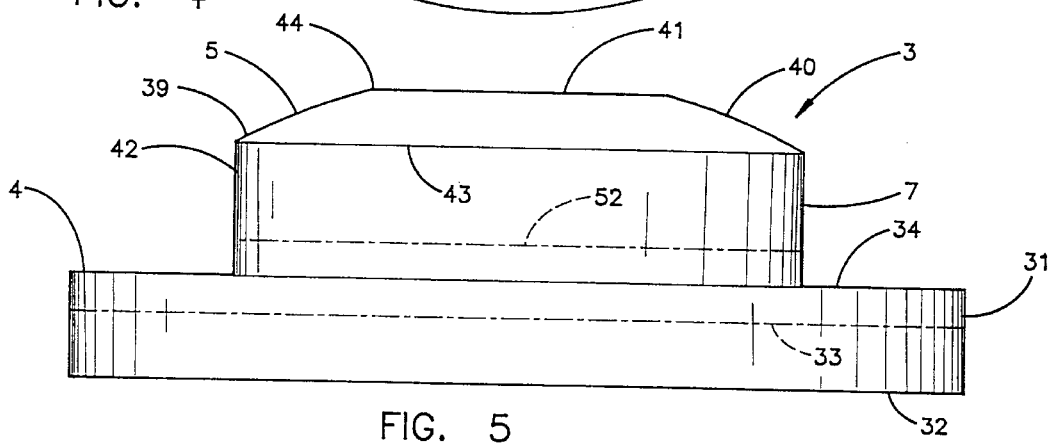
FIG. 5 is an enlarged, side elevational view of the valve.
Figure 6:
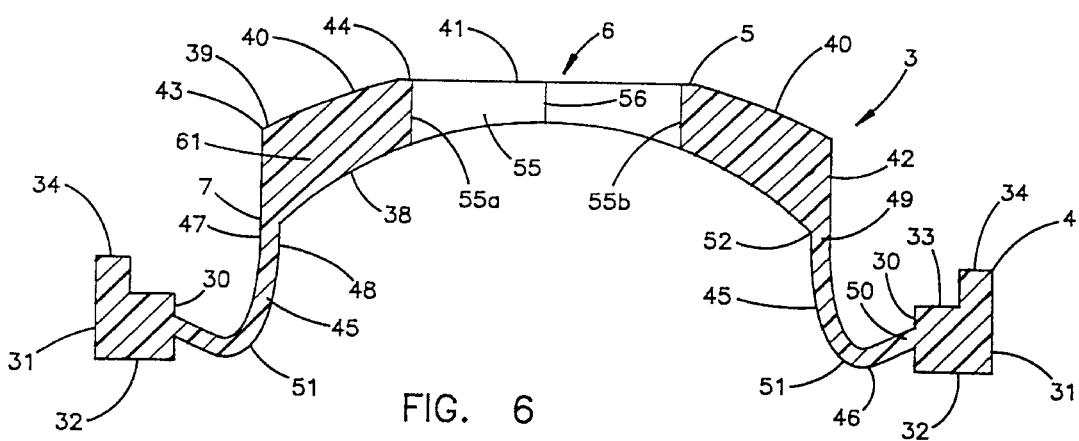
FIG. 6 is an enlarged, cross-sectional view of the valve.

With reference to FIGS. 4–6, the illustrated self-sealing dispensing valve 3 has an integrally formed, one-piece construction. Valve 3 has an interior side which interfaces with the fluid product 18 in container 2, and an oppositely oriented exterior side which interfaces with ambient environment. Valve 3 is preferably molded from a resiliently flexible material, and in the illustrated example comprises a silicone rubber which is substantially inert so as to avoid reaction with and/or adulteration of the fluid product being packaged. In one working embodiment of the present invention, valve 3 is produced at relatively high speeds through the molding of liquid silicone rubber.

The illustrated marginal flange portion 4 (FIGS. 4–6) of valve 3 has an annular plan shape, and a substantially L-shaped cross-sectional configuration, comprising an inner edge 30, an outer edge 31, a bottom 32, and a top 33 with an outer rim 34 upstanding therefrom. Marginal valve flange 4 has substantial thickness between the bottom 32 and top 33 which is resiliently compressed upon attachment of retainer ring 23 to form a secure leak-resistant seal therebetween. The rim portion 34 of valve flange 4 positively locks valve 3 in neck groove 22 to prevent any radial movement therebetween.

The illustrated head portion 5 (FIGS. 4–6) of valve 3 has a circular plan shape, and a generally tapered construction which is thicker at the radially outside portion of valve head 5, and thinner at the radially inside portion thereof. This tapered construction assists in achieving the snap open/snap close action of valve 3, as described below. More specifically, in the illustrated example, valve head 5 has an exterior side or surface 38, which has an arcuately shaped side elevational configuration which opens or curves outwardly, toward the exterior of dispensing package 1, and is defined by a first, predetermined radius. Valve head exterior surface 38 extends continuously between the interior sidewalls of connector sleeve 7. Valve head 5 also includes an interior side or surface 39, which has a marginal portion 40 with an arcuately shaped side elevational configuration which opens or curves outwardly, toward the exterior of dispensing package 1, and is defined by a second predetermined radius. The radius of marginal portion 40 on interior surface 39 is larger than that of exterior surface 38, such that the two surfaces converge toward the center of valve head 5 at or adjoining orifice 6, and provide the above-noted inwardly tapered construction of valve head 5. The interior surface 39 of valve head 5 also includes a center portion 41, which has a circular plan shape, with a substantially planar or flat side elevational configuration, oriented generally perpendicularly to discharge orifice 6. The center portion 41 of valve head 5 assists in improving the opening and closing characteristic of valve 3, as set forth below. The outer perimeter of valve head 5 is defined by a circular marginal edge 42, which begins at the outer edge 43 of marginal portion 40, and extends outwardly therefrom with a slight outward taper, ultimately merging into connector sleeve 7. The intersection of the marginal portion 40 and the center portion 41 of valve head 5 defines a circular edge 44. The outside diameter of valve head 5, as measured along marginal edge 42 is substantially smaller than the inside diameter of marginal flange 4, as measured along inner edge 30. As explained in greater detail below, this spacing between valve head 5 and marginal flange 4 permits valve head 5 to shift freely in an axial direction through the center of marginal flange 4.

The connector sleeve portion 7 illustrated in FIGS. 4–6 is in the form of a rolling diaphragm, having a hollow circular plan configuration, and a generally J-shaped longitudinal cross-sectional shape, comprising a cylindrical sidewall portion 45, and a radially outwardly extending base portion 46. Connector sleeve 7 has interior and exterior surfaces 47 and 48 respectively, which are spaced equidistantly apart along the length thereof, such that connector sleeve 7 has a substantially uniform thickness. One end portion 49 of connector sleeve 7 is connected with the exterior surface 38 of valve head 5 adjacent the marginal edge 42 thereof, and the opposite end portion 50 of connector sleeve 7 is connected with the inner edge 30 of marginal valve flange 4. The interior surface 47 of connector sleeve 7 adjacent end 49 is positioned substantially coplanar and contiguous with the marginal edge 42 of valve head 5, while the opposite end 50 of connector sleeve 7 is connected with marginal valve flange 7 at a medial portion of inner edge 30, such that the base portion 46 of connector sleeve 7 flares in a radially inwardly direction from marginal valve flange 46, and also protrudes outwardly toward the exterior of dispensing package 1 at an arcuate portion 51 of connector sleeve 7. The arcuately flared shape of connector sleeve portion 51 assists connector sleeve 7 in first doubling over, and then rollingly extending as valve head 5 shifts outwardly in the manner described in greater detail below. The marginal attachment point of end 49 of connector sleeve 7 to valve head 5, as well as its associated geometry, increases the effectiveness of torque forces which assist in snapping valve 3 open, as discussed hereinafter. The exterior surface 48 of sleeve side wall 45 at end 49 of connector sleeve 7 intersects the exterior surface 38 of valve head 5 at an angle which defines a circular edge 52. In the illustrated example, the exteriormost area of sleeve arcuate portion 51 is disposed substantially in-line with or slightly interior of the bottom 32 of marginal flange 4, so as to facilitate fabrication. The length of connector sleeve 7 is preferably selected sufficiently short to prevent the same from folding in behind valve head 5 when valve head 5 is in the fully extended position (FIGS. 10–14), thereby avoiding interference with the retraction of valve head 5, which is explained in detail below.

The illustrated one-piece valve 3 has a hat-shaped side elevational configuration in its original, normal condition, wherein valve head 5 assumes a generally concave shape. The resilient flexibility of connector sleeve 7 permits the same to double over and then extend rollingly in the manner described hereinafter. Connector sleeve 7 acts as a rolling diaphragm with valve head 5 mounted at the center thereof in a manner which permits valve head 5 to shift or float freely inwardly and outwardly in an axial direction with respect to the opening 21 in container neck 20.

In the illustrated example, discharge orifice 6 (FIGS. 4–6) has a cross-slit construction which includes two, intersecting linear slits 55 and 56 that extend through the opposite sides 38 and 39 of center portion 41. The illustrated slits 55 and 56 are oriented in a mutually perpendicular relationship, and have their opposite ends 55a and 55b positioned slightly inwardly from the outer edge 44 of center portion 41. Orifice slits 55 and 56 define four flaps or pedals 57 which flex inwardly and outwardly to selectively permit the flow of fluid product through valve 3. Slits 55 and 56 are preferably formed by slicing through the center portion 41 of valve head 5, without removing any substantial amount of material therefrom, so that the opposite side faces 58 and 59 (FIGS. 13 & 14) of valve flaps 57 closely seal against one another when discharge orifice 6 is in its normally, fully closed position. The length and location of slits 55 and 56 can be adjusted to vary the predetermined opening and closing pressures of valve 3, as well as other dispensing characteristics of dispensing package 1. The side faces 58 and 59 of each valve flap 57 intersect at their free ends to define an end edge 60. That portion of valve head 5 disposed between marginal portion 40, marginal edge 42, slit ends 55a and 55b, and exterior surface 38 defines a ring portion 61 of the valve head 5, which functions in the manner described in detail hereinafter.

It is to be understood that orifice 6 may assume many different shapes, sizes and/or configurations in accordance with those dispensing characteristics desired. For example, orifice 6 may comprise a single slit, particularly when smaller or narrower streams are desired. Orifice 6 may also include three or more slits, particularly when larger or wider streams are desired, and/or the fluid product contains aggregates, such as some types of salad dressings, and the like. Other forms of orifice 6, such as holes, duck bills, etc. may also be incorporated into valve 3.

Self-sealing dispensing valve 3 is preferably especially configured for use in conjunction with a particular container 2, and a specific type of fluid product, so as to achieve the exact dispensing characteristics desired. For example, the viscosity and density of the fluid product are both important factors in designing the specific configuration of valve 3, as is the shape, size, and strength of container 2, particularly when dispensing package 1 is configured for bottom dispensing. The rigidity and durometer of the valve material, and size and shape of both valve head 5 and connector sleeve 7 are also important in achieving the desire dispensing characteristics, and should be carefully matched with both the container 2 and fluid material 18 to be dispensed therefrom.

One working embodiment of the present invention is particularly designed to dispense fluid household products therefrom, such as dishwasher detergents, liquid soap, moisturizing creams, foodstuffs, and the like. When such fluid product materials are to be dispensed from a blow molded, polypropylene container with valve 3 positioned at the bottom 4 thereof for bottom dispensing, one specific valve 3 found to be particularly suited is as follows. The outside and inside diameters of marginal valve flange 4 are 0.7000 and 0.5802 inches respectively, while the outside diameter of the marginal edge 42 of valve head 5 is 0.4391 inches, and the outside diameter of center portion 41 is around 0.2212 inches. The thickness of connector sleeve 7 is approximately 0.0130 inches, and has an overall height, as measured from the bottom 32 of marginal flange 4 to the edge 52 of valve head 5, of 0.1159 inches. The radius of valve head exterior surface 38 is 0.2900 inches, while the radius of the marginal portion 40 of interior surface 39 is 0.0350 inches. Hence, the total thickness of valve head 5 at marginal edge 42 is around 0.0778 inches and around 0.0350 inches at the middle of center portion 41. The overall height of valve 3, as measured from the bottom 32 of marginal flange 4 to the top of center portion 41 is approximately 0.2402 inches. Slits 55 and 56 have a length of around 0.2200 inches, and are centered squarely in valve center portion 41. The valve is molded integrally from a liquid silicone rubber of the type manufactured under the trademark "SILASTIC LSR" by Dow Corning Corporation.

Experimental tests conducted on valves having the above-identified specific dimensions and characteristics indicate that valve 3 snaps open when exposed to a pressure inside container 2 equal to approximately 25–28 inches of water. That pressure which causes valve 3 to snap open is generally referred to herein as the predetermined dispensing or opening pressure. Valve 3 will automatically snap closed when the interior pressure of container 2 drops below a pressure equal to approximately 16–18 inches of water. That pressure which causes valve 3 to snap closed is generally referred to herein as the predetermined closing pressure. While the noted valve 3 is open, a substantially constant flow or stream of fluid product is discharged through orifice 6, even when extra pressure is exerted on container 2.

It is to be understood that according to the present invention, valve 3 may assume many different shapes and sizes, particularly in keeping with the type of container 2 and fluid product to be dispensed therefrom. The predetermined opening and closing pressures of valve 3 may be varied widely in accordance with those dispensing criteria desired for a particular product. Flow characteristics of the dispensed fluid product can also be adjusted substantially, such as for relatively wide column-like streams, thin needle-like streams, dollops, and the like.

In operation, dispensing package 1 functions in the following manner. Valve 3 normally assumes the inwardly protruding orientation illustrated in FIG. 7, wherein valve 3 remains substantially in its original molded shape without deformation, with connector sleeve 7 being fully retracted and discharge opening 6 being fully closed. When valve 3 is mounted in the bottom of container 2, as is shown in the illustrated bottom dispensing package 1, valve 3 is configured such that discharge orifice 6 will remain securely closed, even under the hydraulic head pressure applied thereto by the fluid product 18 when the container 2 is completely full.

When additional pressure is communicated with the interior of container 2, such as by manually flexing container sidewalls 14 and 15 inwardly, connector sleeve 7 functions as a rolling diaphragm, and permits valve head 5 to begin shifting axially outwardly toward the exterior of dispensing package 1 by doubling over connector sleeve 7, which then in turn, begins to extend outwardly in a rolling fashion, as illustrated in FIG. 8. The outwardly protruding J-shaped configuration of connector sleeve 7 assists in initiating this rolling motion of connector sleeve 7. The elastic deformation of connector sleeve 7 from its original molded shape (FIG. 7), generates a complex pattern of stresses within valve 3 which resiliently urges the same back into its original or normal configuration, which forces include an outwardly directed torque applied by connector sleeve 7 to valve head 5 adjacent marginal edge 42, which tends to resiliently urge discharge orifice 6 toward its open position, as described in greater detail below.

Figure 9:
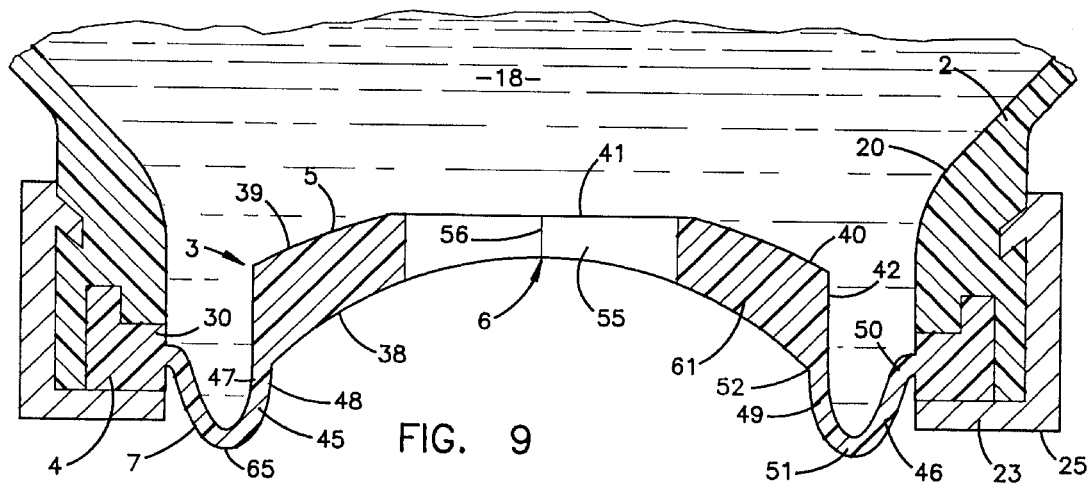
FIG. 9 is an enlarged, cross-sectional view of the valve installed in an associated container, with the valve shown in a fully closed and partially extended position.

When additional pressure is communicated with the interior of container 2, as illustrated in FIG. 9, valve head 5 continues to shift axially outwardly by rolling connector sleeve 7 over upon itself. The marginal edge 42 of valve head 5 passes through the center of marginal valve flange 4.

Figure 10:
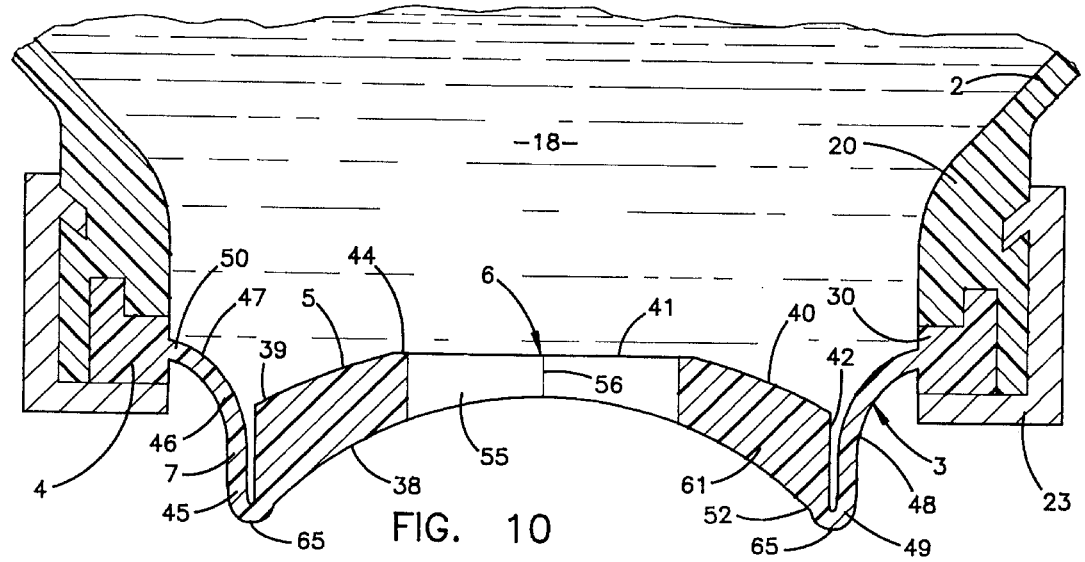
FIG. 10 is an enlarged, cross-sectional view of the valve installed in an associated container, with the valve shown in a fully closed and fully extended position.

When additional pressure is communicated with the interior of container 2, valve head 5 continues to extend outwardly toward the exterior of dispensing package 1 until connector sleeve 7 is fully extended, as illustrated in FIG. 10. When valve heads are in the fully extended position (FIG. 10), the stress forces built up in connector sleeve 7 cause the sidewall portion 45 of the connector sleeve 7 to assume a generally cylindrical shape concentric with and about the marginal edge 42 of valve head 5. Sidewall 45 of connector sleeve 7 is folded back 180 degrees from its original molded shape, to an orientation parallel with the marginal edge 42 of valve head 5, and defines an exterior lip or rim 65.

When additional pressure is communicated with the interior of container 2, as illustrated in FIG. 11, valve head 5 continues to shift outwardly. However, since connector sleeve 7 is fully extended, further outward shifting of valve head 5 longitudinally tenses or stretches connector sleeve 7, thereby increasing the outwardly directed torque applied to the valve head 5. Also, the further outward movement of valve head 5 tends to flatten or straighten valve head 5, particularly along the exterior surface 38 thereof, as best illustrated in FIG. 11. This flattening motion tends to enlarge or dilate the circular plan configuration of valve head 5, which enlargement is in turn resisted by radially inwardly directed forces applied to the marginal edge 42 of valve head 5 by connector sleeve 7, thereby generating another complex pattern of stresses within valve 3, which forces include those which tend to compress valve head 5 in a radially inward direction. Due to the tapered shape of valve head 5, the majority of compression strain is believed to take place adjacent the center portion 41 of valve head 5. As best illustrated by a comparison of the broken line figure and the full line figure provided in FIG. 11, when connector sleeve 7 is in the fully extended position, as shown in the broken lines, and additional pressure is communicated with the interior side 39 of valve 3, exterior rim 65 moves axially outwardly and radially outwardly as shown in the full lines of FIG. 11. The marginal edge 42 of valve head 5 is shown bent or elastically deformed inwardly as a consequence of the torque forces applied thereto by connector sleeve 7.

When additional pressure is communicated with the interior of container 2, as illustrated in FIG. 12, valve head 5 continues to shift outwardly by further longitudinal stretching of connector sleeve 7, and further enlargement of the plan shape of valve head 5. This motion is best illustrated by a comparison of the broken line figure and the full line figure provided in FIG. 12. Exterior rim 65 moves from the condition illustrated in FIG. 11, which corresponds to the broken line figure of FIG. 12, in an axially outwardly and radially outwardly fashion to the position shown in the full lines of FIG. 12. The marginal edge 42 of valve head 5 is shown more bent or elastically deformed inwardly, as a consequence of the increased torque forces applied thereto by connector sleeve 7. These combined forces and motions also serve to further compress valve head 5 into a state of bifurcation, as illustrated in FIG. 12, wherein the combined forces acting on valve head 5 will, upon application of any additional outward force on the interior side 39 of valve 3, cause the same to quickly open outwardly with a snapping motion to separate valve flaps 57 in the manner illustrated in FIGS. 13 and 14, and thereby dispense liquid product through discharge orifice 6. The bifurcation state of valve 3, as the term is used herein, is illustrated in FIG. 12, and defines a relatively unstable condition which valve 3 assumes immediately prior to opening into the fully open condition shown in FIGS. 13 and 14. As valve 3 passes through the bifurcation state shown in FIG. 12, the combined forces acting on valve head 5 are in a very temporary, unstable condition of equilibrium for a given moment, and then quickly shift valve head 5 into a generally convex shape, simultaneously opening orifice 6. In the bifurcation state shown by the full lines in FIG. 12, valve head 5 assumes the shape of a nearly planar disc, with exterior surface 38 cupped inwardly between rim 65 and flap edges 60, and interior surface 39 bent slightly outwardly toward the center of orifice 6.

The snap type opening of valve 3 is achieved, at least in part, by the torque exerted on valve head 5 by connector sleeve 7, which as noted in the example illustrated in FIG. 12, is sufficient to substantially distort the shape of the marginal edge 42 of valve head 5. When valve 3 assumes the fully extended and fully open position illustrated in FIGS. 13 and 14, valve flaps 57, as well as the associated rim portion 61 of valve head 5 are bent or elastically deformed outwardly, thereby permitting the rim 65 of valve head 5 to become smaller or constrict slightly. Valve flaps 57 tend to fold openly along lines extending between the ends 55*a* and 55*b* or orifice slits 55 and 56. The continued radial inwardly compression applied to valve head 5 by connector sleeve 7, in addition to the outwardly oriented torque applied thereto by connector sleeve 7, combine to keep discharge orifice 6 in the fully open position, even if the pressure communicated with the interior of container 2 is reduced. Hence, after discharge orifice 6 has been opened through the application of the predetermined opening pressure, that pressure which is required to maintain fluid flow through orifice 6 is reduced, or less than the threshold pressure, so as to provide greater dispensing ease and flow control. Since the resiliency of connector sleeve 7 serves to resist the dilating action of valve head 5, and thereby compresses the same to achieve a snap open/snap close motion, if the resiliency of connector sleeve 7 is varied somewhat, such as by making connector sleeve 7 thicker or thinner, the amount or degree of snap action can be thereby adjusted for any specific application. Similarly the resilient strength of ring 61 can be adjusted to accomplish the desired snap action.

Figure 13:
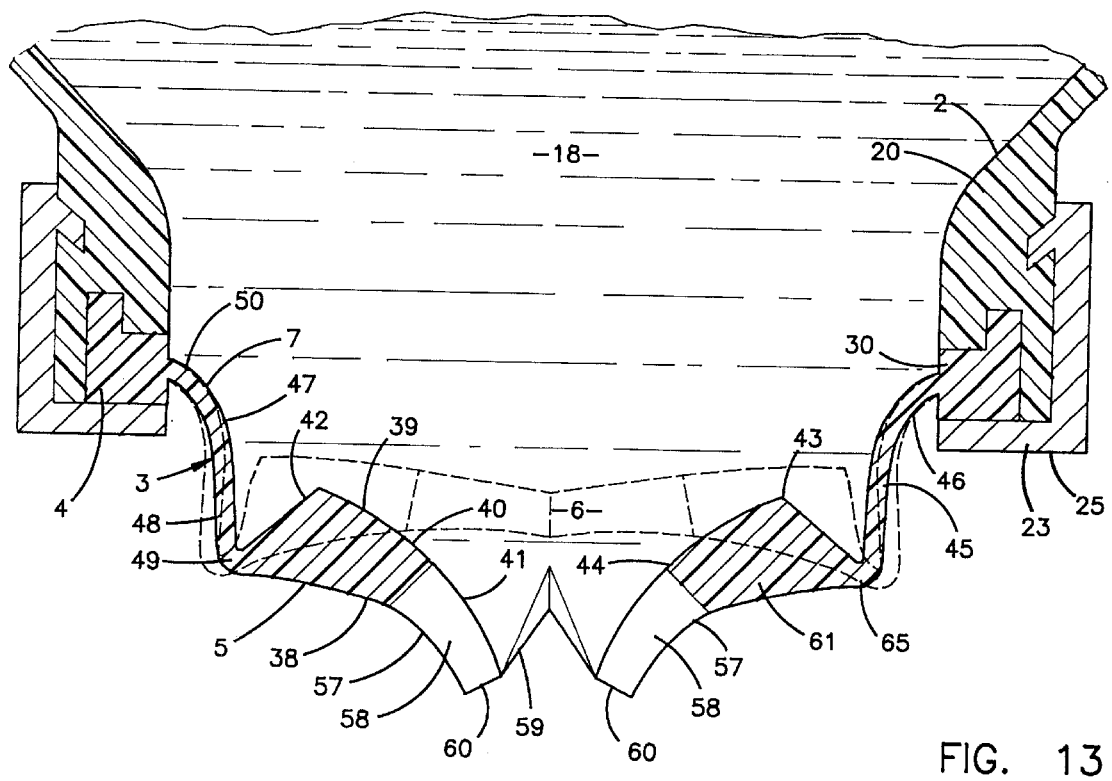
FIG. 13 is an enlarged, cross-sectional view of the valve installed in an associated container, with the valve shown in a fully open, and fully extended position, wherein the valve head portion of which is shown snapped fully outwardly.
Figure 14:
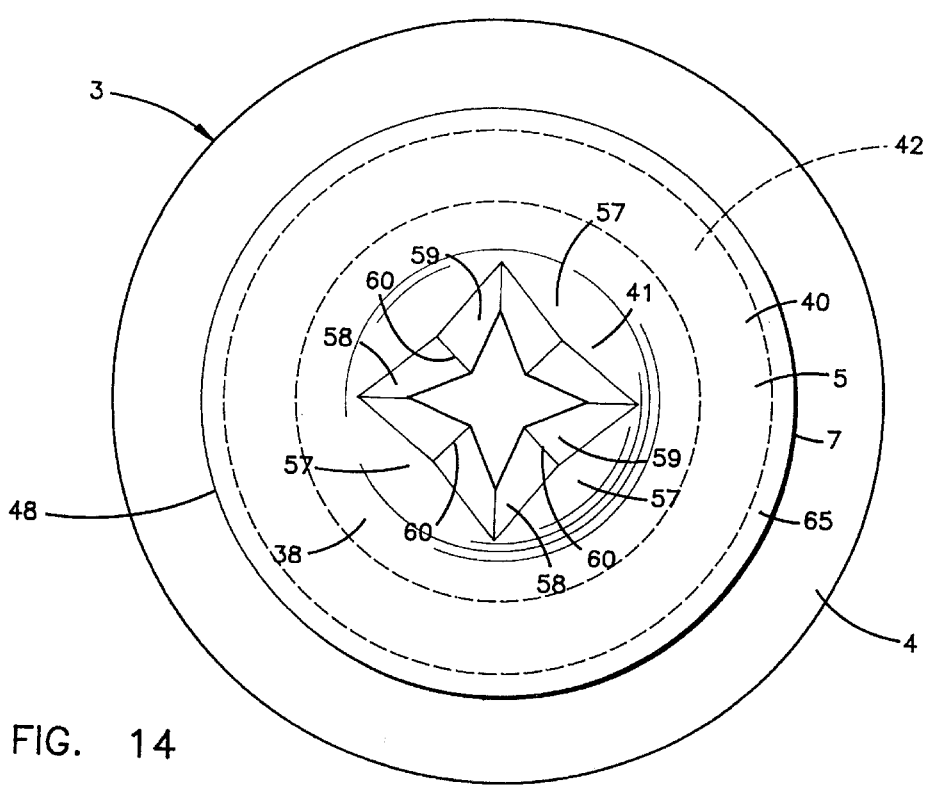
FIG. 14 is an enlarged, bottom plan view of the valve shown in the position illustrated in FIG. 13.

The combined compressive and torque forces acting on valve head 5 by connector sleeve 7 open valve flaps 57 to a generally predetermined configuration, such that the rate of flow through discharge orifice 6 remains substantially constant, even though significant pressure differences are applied to container 2. As best illustrated in FIGS. 13 and 14, after valve 3 passes through the bifurcation state shown in FIG. 12, in the direction of opening, it quickly and positively assumes the fully open condition shown in FIGS. 13 and 14, wherein the end edges 60 of valve flaps 57 diverge radially outwardly, such that discharge opening 6 assumes a star shaped plan configuration, as best seen in FIG. 14. The marginal edge 42 of valve head 5 rotates or pivots inwardly somewhat under the pressure of fluid product 18, and the resilient torque applied thereto by connector sleeve 5, which continues to resiliently urge valve 3 back toward its original molded shape (FIG. 7). Connector sleeve 7 remains tensed both axially and circumferentially under outwardly directed forces generated by the pressures within container 2, as well as the dynamic flow of fluid product through orifice 6. The geometry of the illustrated valve 3, particularly in the shape of valve head 5 and connector sleeve 7, serve to force valve 3 into the configuration shown in FIGS. 13 and 14 whenever orifice 6 is snapped opened.

When pressure within the interior of container 2 is reduced, discharge orifice 6 will still remain open in substantially the fully open position shown in FIGS. 13 and 14, until the pressure reaches the preselected closure pressure, at which point, the forces developed in connector sleeve 7 through elastic deformation from its original molded shape (FIG. 7), pull valve head 5 inwardly, back through the bifurcation state, and into the concave orientation shown in FIG. 10, thereby positively and securely closing discharge orifice 6 with a snapping action, similar to that action by which discharge orifice 6 opened. The snap closing motion of valve head 5 serves to close orifice 6 very quickly and very completely, so as to sharply cut off the stream of fluid product being dispensed from package 1 without any drops or dribbles, even when very viscous and/or dense products are being dispensed. Valve 3 will continue to assume the fully closed, fully extended position illustrated in FIG. 10, until such time as the interior pressure in container 6 is further reduced, so as to permit the resiliency in connector sleeve 7 to shift valve head 5 back into the fully retracted, initial position illustrated in FIG. 7.

At least some of those valves 3 contemplated by the present invention have a relatively high predetermined closing pressure, such as in the nature of 17–18 inches of water, so that orifice 6 will snap securely closed even if container 2 does not provide any suck back, or negative pressure. Furthermore, the connector sleeve 7 of at least some such valves 3 is constructed to provide sufficient resiliency to automatically shift valve head 5 back to the fully retracted position (FIG. 7) without any suck back or negative pressure from container 2. Hence, valves 3 can be readily adapted for use in conjunction with containers which include collapsing bags, tubes or the like. Also, valves 3 are particularly adapted for bottom dispensing packages, such as those illustrated in FIGS. 1–3, where valve 3 normally supports a column of liquid product.

In many embodiments of dispensing package 1, container 2 will be designed with relatively stiff sidewalls 14 and 15 which resume their original shape after being squeezed. In such embodiments, the suck back of air into container 2 after dispensing fluid product therefrom is typically desired to prevent collapsing the container 2, and thereby facilitate continued ease of dispensing until container 2 is completely empty. When valve 3 is in the fully closed and fully retracted position (FIG. 9), the concave configuration of valve head 5 permits orifice 6 to readily open inwardly so that air can be sucked back into the interior of container 2, yet positively prevents orifice 6 from opening outwardly in a manner which would permit leakage. Hence, even relatively weak, thin walled containers 2 can be used with valve 3 without significant collapsing of container sidewalls 14 and 15.

Figure 15:
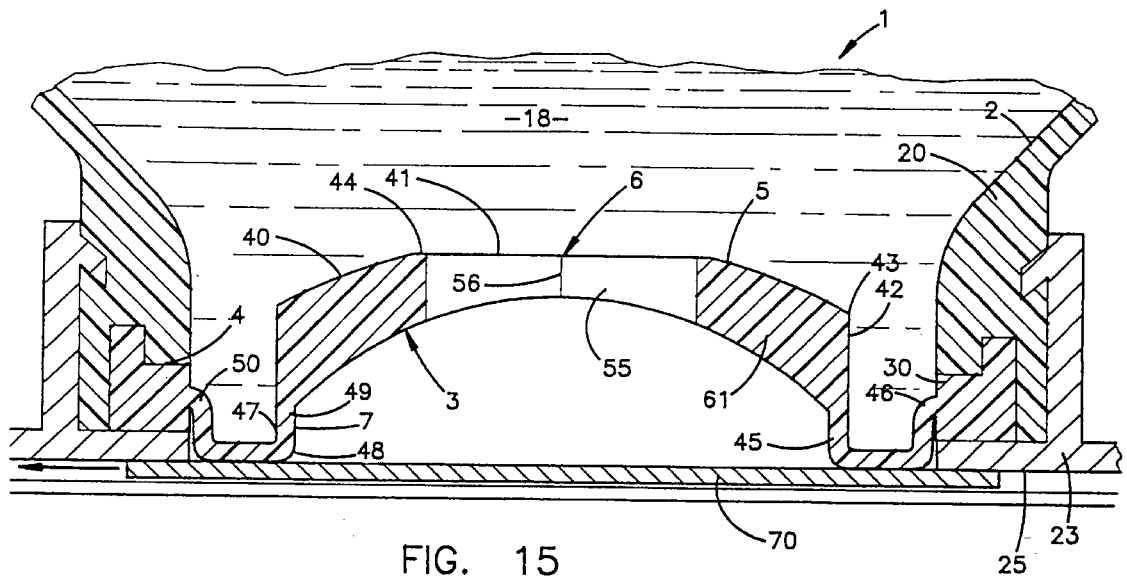
FIG. 15 is an enlarged, cross-sectional view of the valve installed in an associated container, with the valve shown in a fully closed, and partially extended position abutting a container closure.

With reference to FIG. 15, dispensing package 1 may be provided with a positive closure arrangement to prevent inadvertent discharge when dispensing package 1 is being transported, or the like, such as for initial shipping, travel, etc. The dispensing package 1 shown in FIG. 15 includes a sliding closure 70, which when closed, physically blocks the outward rolling extension of connector sleeve 7 and associated valve head 5. By constraining the outwardly extending motion of connector sleeve 7, valve head 5 is prevented from inverting into a convex configuration, and thereby keeps discharge orifice 6 fully closed. When closure 70 is slid sideways out from underneath valve 3, valve 3 is then free to reciprocate and open orifice 6 to dispense liquid product from container 2.

Figure 16:
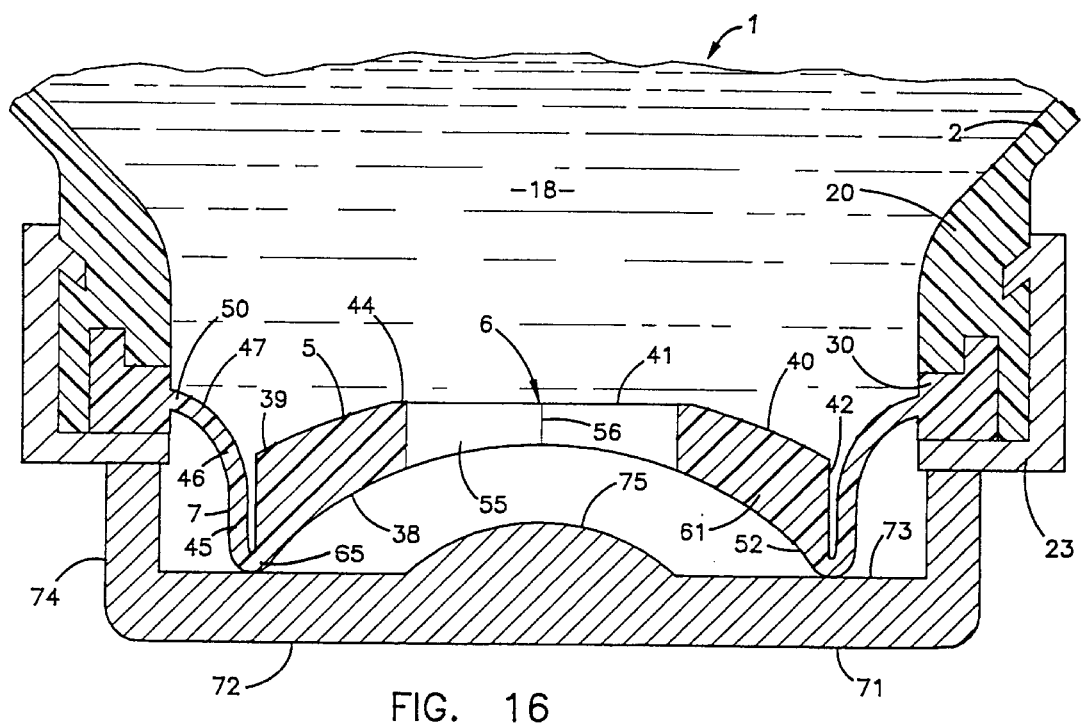
FIG. 16 is an enlarged, cross-sectional view of the valve installed in an associated container, with the valve shown in a fully closed and fully extended position abutting an alternative container closure.

FIG. 16 is a partially schematic view of an alternative closure arrangement for dispensing package 1, wherein a removable cap 71 is provided for detachable connection with retainer ring 23 by conventional fastener means, such as a snap lock, hinge, etc. (not shown). The illustrated cap 71 has a generally flat exterior surface 72, an interior surface 73, and a cylindrical sidewall 74, which is sized and shaped such that interior cap surface 73 abuts the rim 65 of valve 3 when valve head 5 is in its fully extended position. The central portion of cap interior surface 73 includes an inwardly projecting protuberance 75, which in the illustrated example, is generally in the form of a convex, semispherical node that extends inwardly toward valve 3 to a position adjacent to the cupped exterior surface 38 of valve 3. Node 75 is shaped to positively retain valve head 5 in a concave configuration, and thereby securely maintain orifice 6 fully closed.

The reciprocating motion of valve head 5 on rolling connector sleeve 7 provides dispensing package 1 with several important advantages. For example, connector sleeve 7 is preferably configured with sufficient flexibility that abnormal pressure increases developed within the interior of container 2, such as those caused by thermal expansion, or the like, are offset by the axial shifting motion of valve head 5 with respect to connector sleeve 7, so as to alleviate excess pressure on discharge orifice 6. In this manner, if dispensing package 1 were used in conjunction with a liquid soap or shampoo that was designed for hanging in an inverted condition in a shower or bath, when ambient temperatures within the shower rise, instead of communicating the associated pressure increases directly to discharge orifice 6 in a manner which might cause it to inadvertently open, valve head 5 shifts axially outwardly to relieve any such pressure, and thereby prevent any inadvertent leakage of the fluid product from dispensing package 1.

Another example of the benefits achieved by the rolling diaphragm action of connector sleeve 7 and axial reciprocating motion of valve head 5, is that connector sleeve 7 is preferably configured with sufficient flexibility that any misalignment and/or distortion of the valve flange 4, such as that experienced when attaching the valve to container 2, are not transmitted to valve head 5, thereby permitting unhindered operation of discharge orifice 6. As previously noted, due to the inherently sticky nature of liquid silicone rubber, the attachment of valves constructed from the same to a container 2 can be quite difficult, and often results in some type of unequal compression and/or distortion of the marginal flange 4 of valve 3. Without the rolling diaphragm action of connector sleeve 7, any such distortion is communicated directly to the valve head 5, which in turn distorts discharge orifice 6, and alters important design characteristics such as its predetermined opening pressure, closing pressure, flow rate, etc. The rolling diaphragm connector sleeve 7 associated with the present valve 3 tends to insulate or isolate valve head 5 from marginal flange 7, such that it can float freely, and thereby avoid such problems.

Yet another example of the benefits achieved by this aspect of the present invention is that connector sleeve 7 is preferably configured with sufficient flexibility that vibrations, shock impact forces, and the like applied to container 2 are absorbed and/or dampened by shifting valve head 5 on rolling connector sleeve 7, so as to avoid inadvertent opening of discharge opening 6. In the event dispensing package 1 is dropped onto the floor, slammed forcefully against a worksurface, or otherwise jarred or shook, the shock forces arising from the acceleration and/or deceleration of the fluid product within container 2 would otherwise be communicated directly with the discharge orifice 6, and tend to cause it to open inadvertently. However, the rolling connector sleeve 7 action of valve 3 serves as a cushion or shock absorber for such shock impact forces, and thereby greatly alleviates the chance for the inadvertent discharge of fluid product from dispensing package 1. In a similar manner, when dispensing container 1 is used for non-homogenous fluids, such as some types of salad dressings, or the like, which are typically shook prior to use, connector sleeve 7 assists in absorbing these vibrations, and thereby prevent leakage.

Yet another example of the benefits achieved by this aspect of the present invention is that connector sleeve 7 is preferably configured with sufficient flexibility that only very moderate pressures, substantially lower than the predetermined opening pressure of valve 3, are required to shift valve head 5 from the fully retracted position (FIG. 7) to the fully extended position (FIG. 10), thereby improving the dispensing "feel" of the package 1. When the user grasps container 2, even a very light squeeze on sidewalls 14 and 15 will rollingly extend connector sleeve 7 and valve head 5 to the fully extended and fully closed position shown in FIG. 10, at which point valve head 5 halts momentarily and further movement of the fluid product is resisted until additional forces are exerted on container 2 which result in an internal pressure within container 2 greater than the predetermined opening pressure of valve 3. This motion of connector sleeve 7 and valve head 5 is sensed by the user through touch or feel, typically in the form of a vibration or ripple experienced in container sidewalls 14 and 15 when valve head 5 reaches the fully extended position (FIG. 10). This ripple motion signals the user that valve head 5 is fully extended, and that further pressure will cause valve 3 to snap open and dispense fluid product. When valve 3 snaps open and snaps closed, similar vibrations or ripples are communicated to the user through container sidewalls 14 and 15 to assist in achieving accurate flow control.

In the illustrated examples of dispensing package 1, valve 3 is mounted within container 2 in a manner which causes valve head 5 to shift between the fully retracted position shown in FIG. 7 wherein valve 3 is disposed wholly within the interior of container 2 for safely storing valve 3, and the fully extended discharge position shown in FIGS. 13 and 14 wherein valve head 5 and associated orifice 6 are disposed wholly outside container 2 for neatly dispensing the fluid product therethrough. By shifting valve head 5 between these two extreme positions, valve 3 can remain normally unexposed and secure within the container 2 when not in use, without sacrificing neatness when dispensing. Also, valve 3 is preferably positioned in container 2 so that the arcuate portion 51 of connector sleeve 7 is disposed adjacent the bottom 25 of container base 13, so that if dispensing package is slammed down onto a surface, abutment between valve 3 and the surface will prevent valve 3 from shifting to the fully extended position, and thereby keep orifice 6 closed to prevent inadvertent leakage.

Dispensing package 1 is extremely versatile, being capable of easily and neatly dispensing a wide variety of fluid products. The self-sealing valve 3 is matched with both the container 2 and the type of liquid product 18 to be dispensed therefrom, so as to quickly and securely seal, yet readily open upon manipulation by the user, without requiring excess pressure or forces. The resiliently flexible connector sleeve 7, which is configured to double over and extend rollingly, accommodates for thermal expansion within container 2, absorbs shock impact forces to the container, accommodates for any misalignment and/or distortion which might be applied to the valve flange in attaching the same to the container, and provides a unique dispensing feel which greatly facilitates accurate dispensing. Valve 3 is configured so that when orifice 6 snaps open, a generally constant flow rate is established therethrough, even when container 2 is subjected to a relatively wide range of pressures. Valve 3 is also preferably configured such that once discharge orifice 6 is open, the amount of pressure required to maintain fluid flow is reduced, so as to provide greater ease of operation and control, without sacrificing secure sealing. Dispensing package 1 is particularly adapted for bottom dispensing configurations, shake containers, and other similar packaging concepts, without leakage.

The reference numeral 1a (FIGS. 20–23) generally designates another dispensing package embodying the present invention, which is particularly adapted for dispensing product from the top of the associated container 2a. Since dispensing package 1a is similar to the previously described dispensing package 1, similar parts appearing in FIGS. 1–16 and FIGS. 17–23 respectively are represented by the same, corresponding reference numeral, except for the suffix "a" in the numerals of the latter.

The illustrated container 2a (FIG. 20) is particularly designed for top dispensing, and includes a generally flexible, oblong container body that may be integrally molded from an appropriate synthetic resin material or the like, so as to create a one-piece construction that includes oppositely oriented sidewalls 14a and 15a, a top 16a, and a bottom 17a. The container sidewalls 14a and 15a are laterally flexible to pressurize and depressurize the interior of container 2a, and preferably have sufficient resiliency or stiffness that they automatically return to their original shape upon release of any external forces which are applied to container 2a to dispense a fluid product 18a therefrom.

The illustrated container top 16a (FIGS. 20–21) includes a neck 20a, which is normally in an upwardly opening orientation when not dispensing, and defines a discharge opening 21a about which the marginal portion 4a of dispensing valve 3a is positioned. The free end of neck 20a includes an annularly shaped groove 22a having a generally L-shaped longitudinal, cross-sectional configuration, which is shaped to closely receive the marginal portion 4a of valve 3a therein. A valve retainer ring 23a is positioned adjacent groove 22a, and is attached to the neck 20a of container 2a by a snap lock arrangement. Container base 17a has a substantially flat, annularly shaped outer bottom 25a adapted to abuttingly support dispensing package 1a upright on an associated surface, such as a countertop, sink, worksurface, or the like. In the dispensing package 1a shown in FIGS. 20–23, dispensing valve 3a is positioned in a generally extended condition within dispensing package 2a, as opposed to the generally recessed condition of valve 3 in dispensing package 1 (FIGS. 1–17), as described hereinabove.

Figure 17:
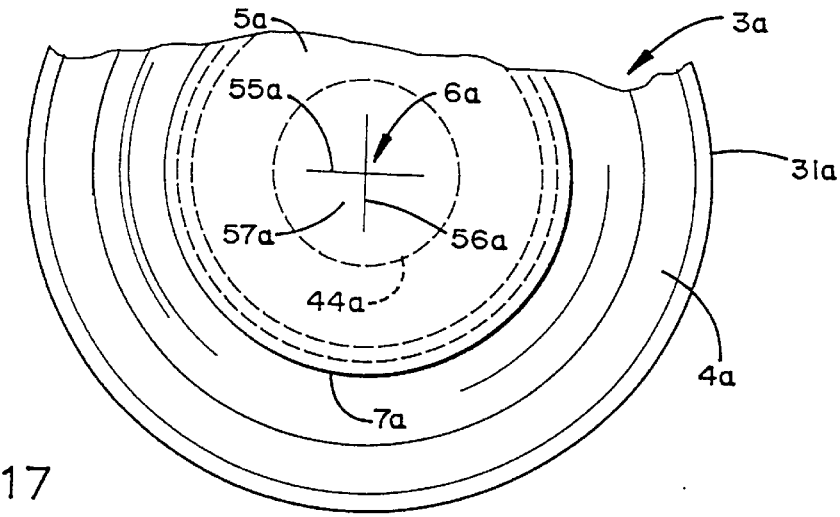
FIG. 17 is an enlarged, fragmentary top plan view of another dispensing valve embodying the present invention.
Figure 18:
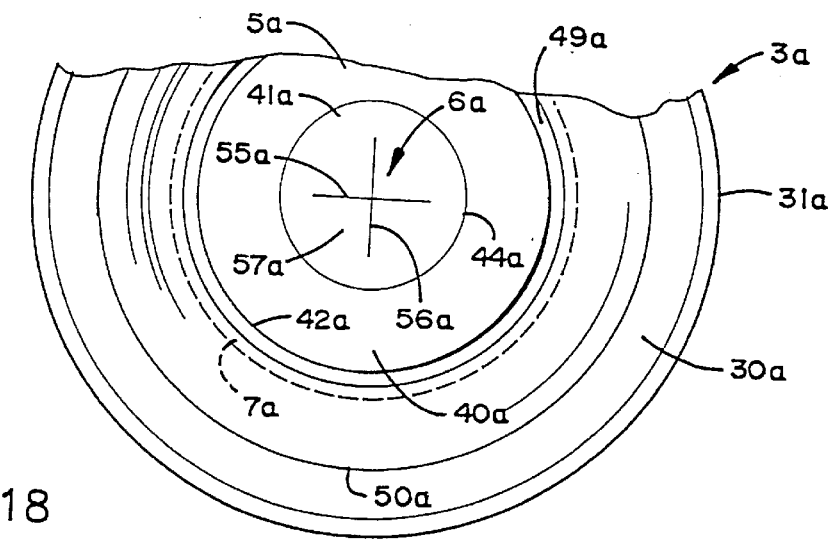
FIG. 18 is an enlarged, fragmentary bottom plan view of the valve shown in FIG. 17.
Figure 19:
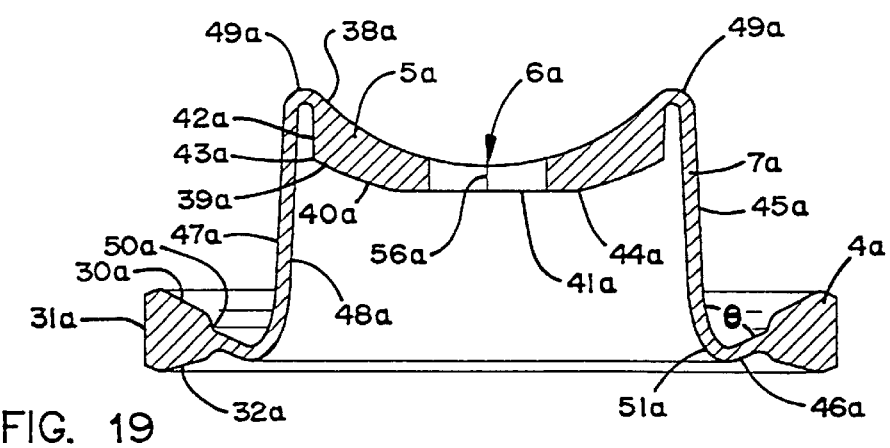
FIG. 19 is an enlarged, cross-sectional view of the valve shown in FIGS. 17–18.
Figure 20:
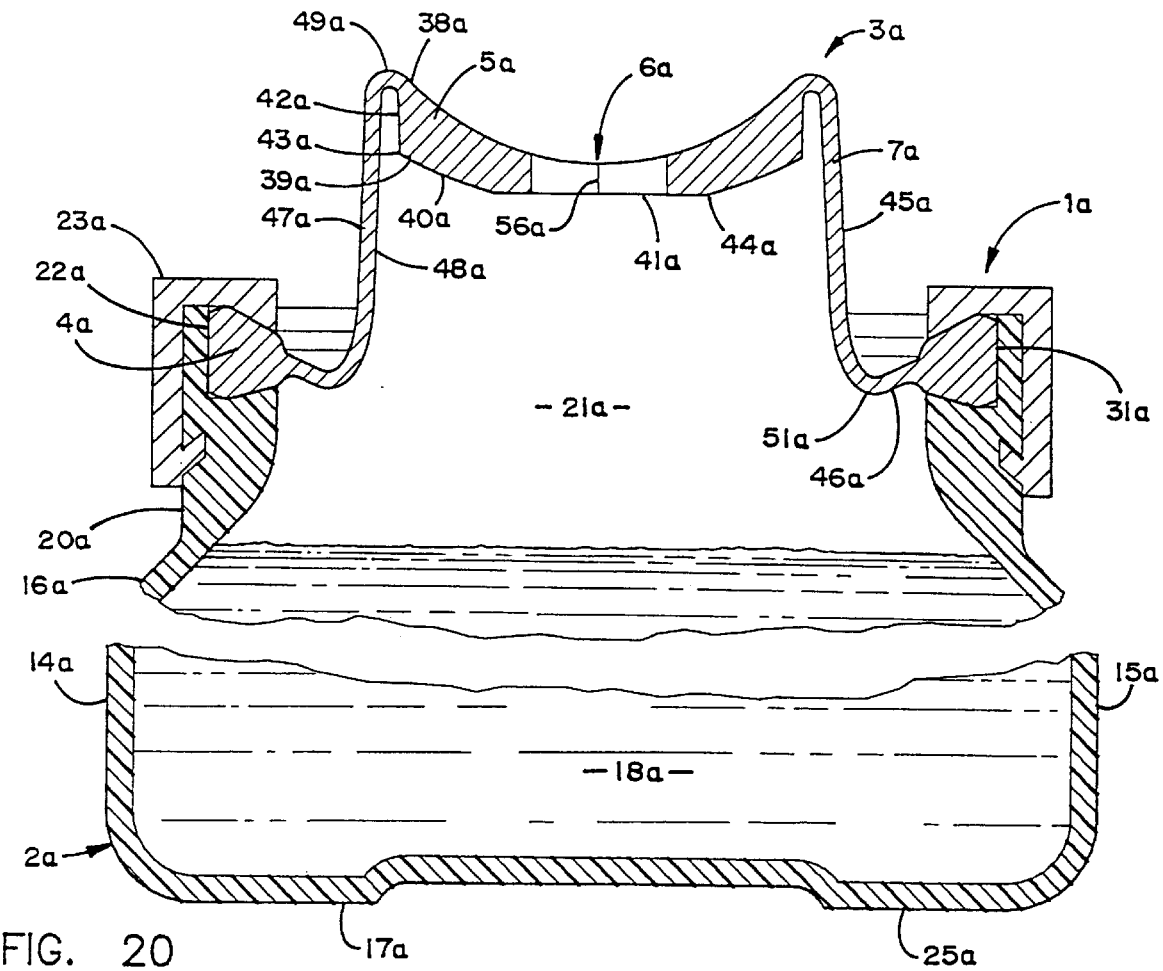
FIG. 20 is an enlarged, vertical cross-sectional view of the valve shown in FIGS. 17–19 installed in an associated top dispense container, with the container in a fully upright orientation, and the valve in a fully closed position.
Figure 22:
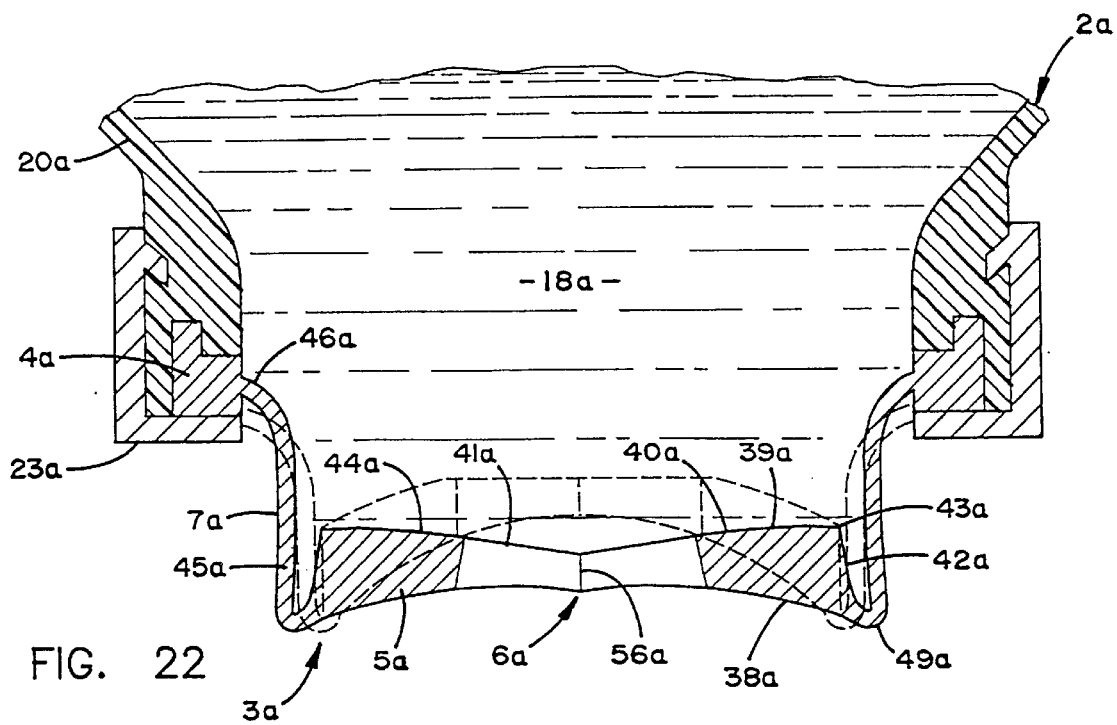
FIG. 22 is an enlarged, cross-sectional view of the valve and associated top dispense container shown in FIGS. 20–21, with the container in the inverted orientation, and the valve in a closed, partially extended position, wherein a valve head portion is shown beginning to snap outwardly.
Figure 23:
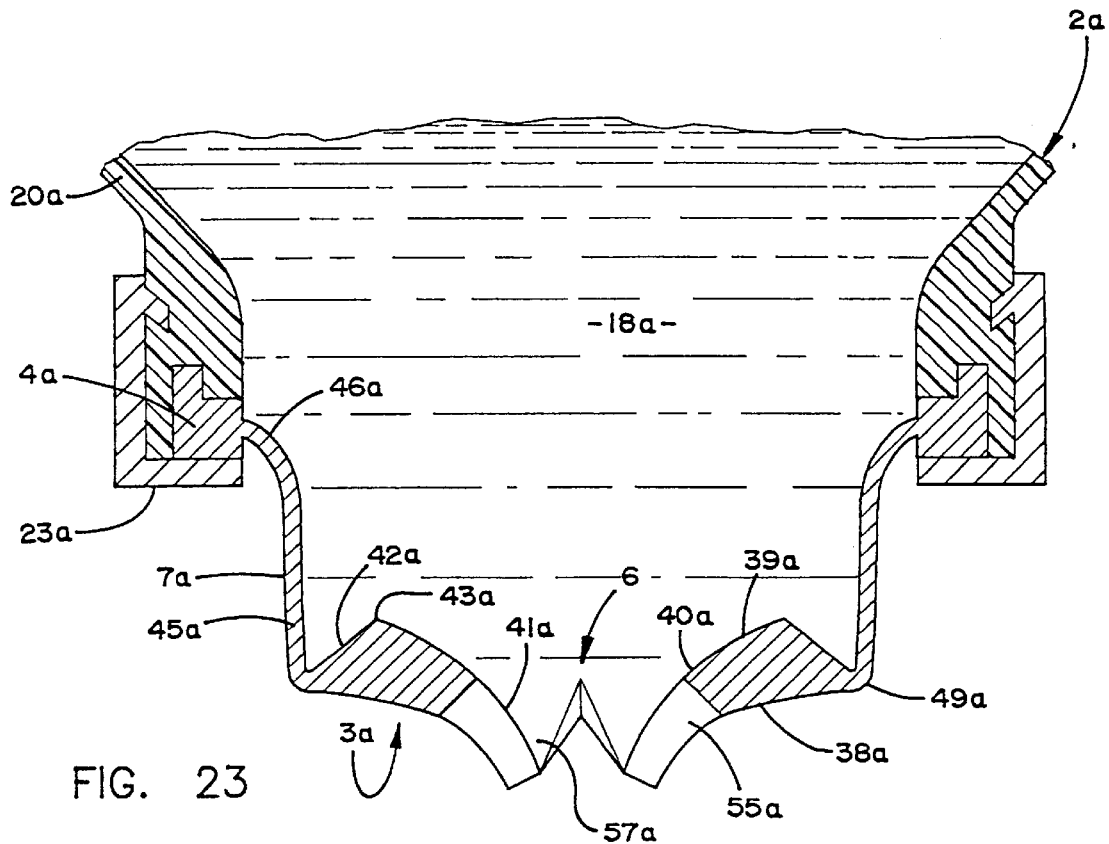
FIG. 23 is an enlarged, cross-sectional view of the valve and associated top dispense container shown in FIGS. 20–22, with the container in the inverted orientation, and the valve in a fully open, and fully extended position, wherein the valve head portion is shown snapped fully outwardly.

With reference to FIGS. 17–19, the illustrated dispensing valve 3a is generally similar to previously described dispensing valve 3, and comprising a marginal portion 4a, a head portion 5a with a discharge orifice 6a therein, and a connector sleeve 7a, having one end connected with marginal portion 4a, and the opposite end connected with head portion 5a. Connector sleeve 7a has a resiliently flexible construction, such that when pressure within container 2a is raised above a predetermined amount, the head portion 5a of valve 3a shifts outwardly as shown in FIGS. 22 and 23, so as to dispense fluid product 18a therefrom. In contrast to the previously described dispensing valve 1 (FIGS. 1–17), the connector sleeve 7a of dispensing valve 3a does not double over and extend rollingly, but simply shifts outwardly to apply opening forces to valve head 5a in a manner which causes orifice 6a to snap open, as described in greater detail hereinafter.

The flange or marginal portion 4a (FIGS. 17–19) of the illustrated dispensing valve 3a has an annular shape, with a substantially triangular cross-sectional configuration, comprising an upper edge 30a, an outer edge 31a, and a bottom edge 32a. The marginal portion 4a of valve 3a has a thickness between top and bottom edges 30a and 32a which is resiliently compressed upon attachment of retainer ring 23a to form a secure leak resistant seal therebetween.

The head portion 5a (FIGS. 17–19) of the illustrated dispensing valve 3a has a circular plan shape, and a generally tapered construction which is thicker at the radial outside portion of valve head 5a, and thinner at the radial inside portion thereof. This tapered construction assists in achieving the snap open/snap close action of valve 3a, as described below. More specifically, in the illustrated example, valve head 5a has an exterior side or surface 38a, which has an arcuately shaped side elevational configuration that opens outwardly, toward ambient environment, and is defined by a first predetermined radius. Valve head exterior surface 38 extends continuously between the exterior sidewalls of connector sleeve 7a. Valve head 5a also includes an interior side or surface 39a, which has a marginal portion 40a with an arcuately shaped side elevational configuration which curves inwardly, toward the interior of dispensing package 1a, and is defined by a second predetermined radius. The radius of marginal portion 40a on interior surface 39a is larger than that of exterior surface 38a, such that the two surfaces converge toward the center of valve head 5a at or adjoining orifice 6a, and provide the above-noted inwardly tapered construction of valve head 5a. The interior surface 39a of valve head 5a also includes a center portion 41a, which has a circular plan shape, with a substantially planar or flat side elevational configuration, oriented generally perpendicularly to discharge orifice 6a. The center portion 41a of valve head 5a assists in improving the opening and closing characteristics of valve 3a, as set forth below. Valve head 5a has a circular marginal edge 42a, which begins at the outer edge 43a of marginal portion 40a, and extends outwardly therefrom with a slight taper, ultimately merging into connector sleeve 7a. Marginal edge 42a of valve head 5a is spaced radially inwardly of the adjacent upper portion of connector sleeve 7a. The inner section of marginal portion 40a and center portion 41a of head portion 5a define a circular edge 44a.

The connector sleeve portion 7a of the illustrated dispensing valve 3a has a generally J-shaped longitudinal cross-sectional shape, comprising an annular base portion in the form of a first leg portion 46a, and a radially inwardly cylindrical sidewall portion in the form of a second leg portion 45a. Connector sleeve 7a has interior and exterior surfaces 47a and 48a respectively, which are spaced equidistantly apart along the length thereof, such that connector sleeve 7a has a substantially uniform thickness. One end 49a of connector sleeve 7a is connected with the head portion 5a of valve 3a, and the opposite end 50a of connector sleeve 7a is connected with the marginal portion 4a of valve 3a. The first and second leg portions 46a and 45a of connector sleeve 7a are mutually oriented at an acute included angle, as measured between the exterior surfaces of connector sleeve legs 46a and 45a, and noted by the Greek letter theta ("θ") in FIG. 19. The connector sleeve leg portions 46a and 45a join one another at an arcuate portion 51a, which facilitates movement of the head portion 5a of valve 3a when dispensing product from the container 2a.

In the example illustrated in FIGS. 17–19, the first leg portion 46a of connector sleeve 7a is shorter than the second leg portion 45a, and the included angle between them is in the range of 65–85 degrees. Also, the first leg portion 46a of connector sleeve 7a is oriented at an acute angle relative to the axial centerline of the head portion 5a, which extends through slit 56a. The outer edge 42a of valve 3a is generally flat, and oriented substantially parallel with the axial centerline of head portion 5a. The second leg portion 45a of connector sleeve 7a is oriented at an acute angle to the axial centerline of head portion 5a, at an angle in the range of 2–10 degrees.

The connector sleeve 7a of the illustrated dispensing valve 3a has an inverted J-shaped end portion 49a at the top of leg portion 46a, which extends arcuately into the head portion 5a of valve 3a to further facilitate movement of the head portion 5a when dispensing product from the container 3a. As previously noted, the outer edge 42a of valve head 5a is spaced apart from the inside surface of the upper end of connector leg 45a. This spacing between valve head 5a and connector sleeve 7a assists in applying torque to valve head 5a when dispensing product from the associated container in the manner described in detail thereinafter. The inverted J-shaped end portion 49a of connector sleeve leg portion 45a loops around approximately 180 degrees to attach to valve head portion 5a adjacent the outer margin of exterior surface 38a.

In operation, dispensing package 1a functions in the following manner. Valve 3a normally assumes the outwardly protruding orientation illustrated in FIG. 20, wherein valve 3a remains substantially in its original molded shaped without deformation, with a major portion of connector sleeve 7a as well as head portion 5a protruding outwardly from snap ring 23a. When valve 3a is mounted in the top of container 2a, as shown in the illustrated top dispensing package 1a, valve 3a is not normally subjected to the hydraulic head pressure applied thereto by the fluid product 18a.

Figure 21:
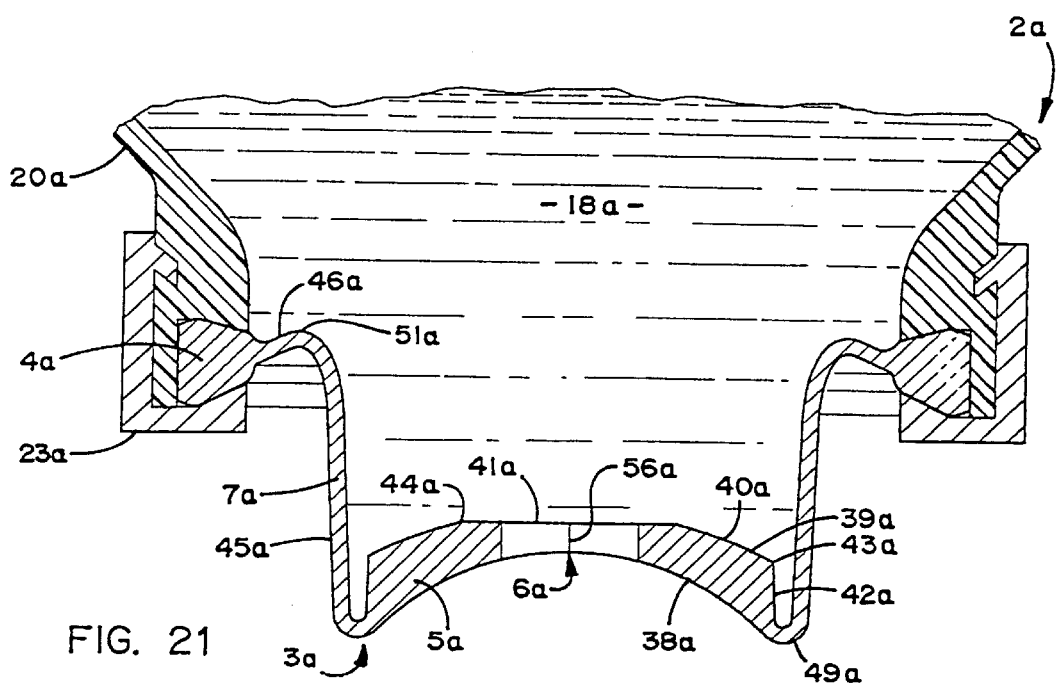
FIG. 21 is an enlarged, vertical cross-sectional view of the valve and associated top dispense container shown in FIG. 20, with the container shown in an inverted orientation, and the valve in its fully closed position.

To dispense product 18a from package 1a, the user first inverts container 2a to the upside down orientation illustrated in FIGS. 21–23. Preferably, discharge orifice 6a is positioned directly over or aligned with the location at which the fluid product 18a is to be dispensed. Additional pressure is then communicated with the interior of container 2a, such as by manually flexing container sidewalls 14a and 15a inwardly. Connector sleeve 7a permits the head portion 5a of valve 3a to begin shifting axially outwardly toward the exterior of dispensing package 1a, as illustrated in FIG. 22. The J-shaped configuration of connector sleeve 7a assists in permitting the axial shifting of valve head portion 5a. The elastic deformation of connector sleeve 7a from its original molded shape generates a complex pattern of stresses within valve 3a which resiliently urges the same back into its original or normal configuration, which forces include an outwardly directed torque applied by connector sleeve 7a to head portion 5a, which tends to resiliently urge discharge opening 6 toward its open position.

When additional pressure is communicated with the interior of container 2a, the head portion 5a of valve 3a continues to shift outwardly by further longitudinal stretching of connector sleeve 7a, and further enlargement of the plan shape of valve head 5a to snap open to the fully open position illustrated in FIG. 23 in a manner similar to that described in detail hereinabove with respect to dispensing valve 1. Since the upper end of the second leg portion 45a is attached to head portion 5a adjacent its outer surface 38, a torque is applied to head portion 5a as the same shifts axially outwardly which tends to snap orifice 6a open. The inverted J-shaped portion 49a of second leg portion 45a assists in effectively applying these opening forces to valve head portion 5a.

Figure 24:
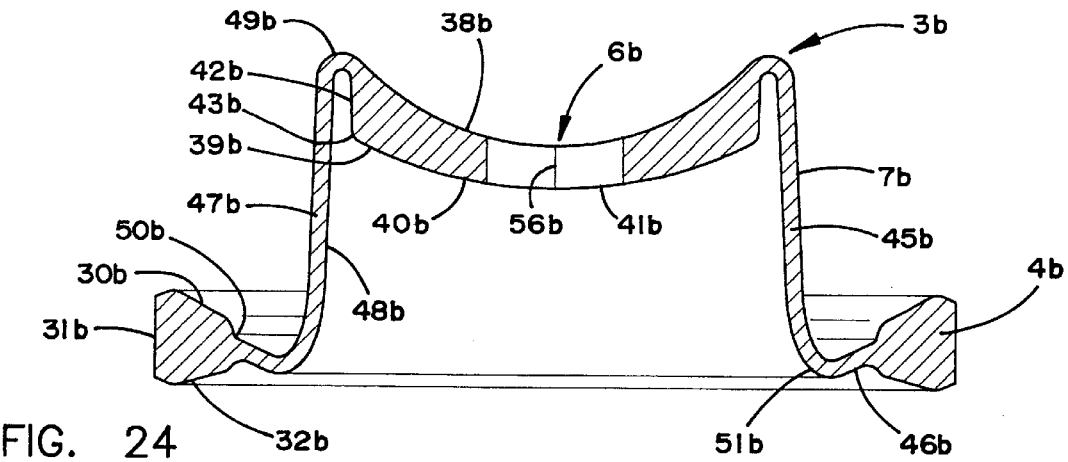
FIG. 24 is an enlarged, cross-sectional view of yet another valve embodying the present invention.
Figure 25:
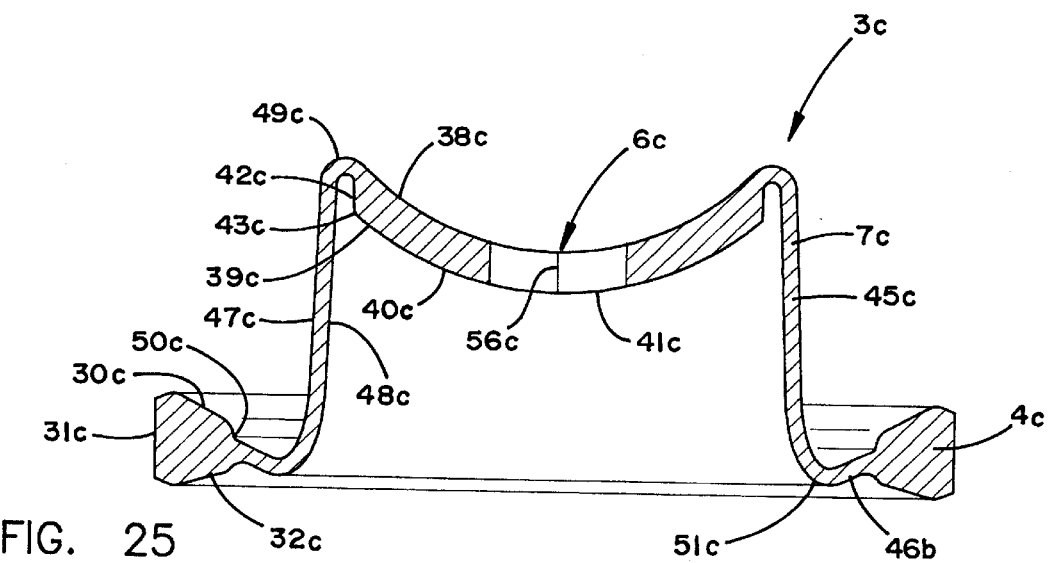
FIG. 25 is an enlarged, cross-sectional view of yet another valve embodying the present invention.
Figure 26:
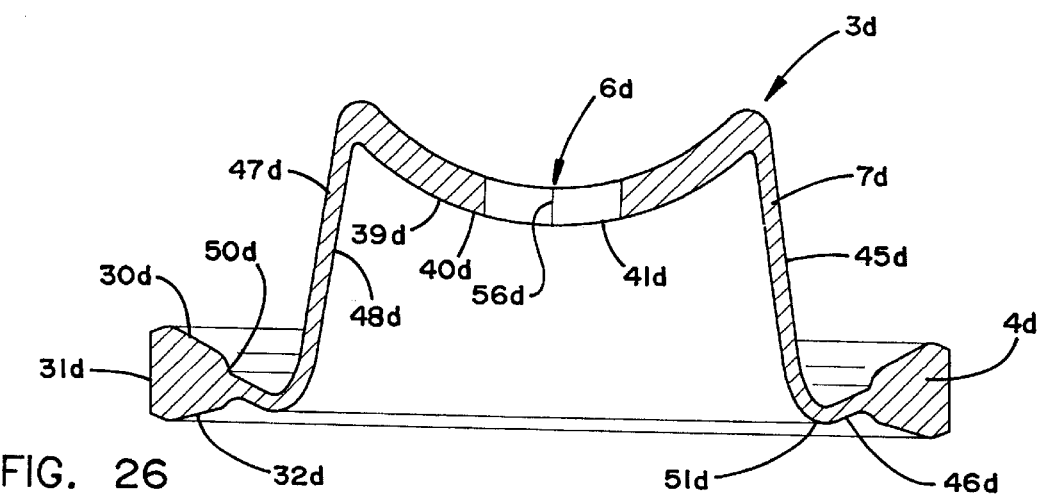
FIG. 26 is an enlarged, cross-sectional view of yet another valve embodying the present invention.
Figure 27:
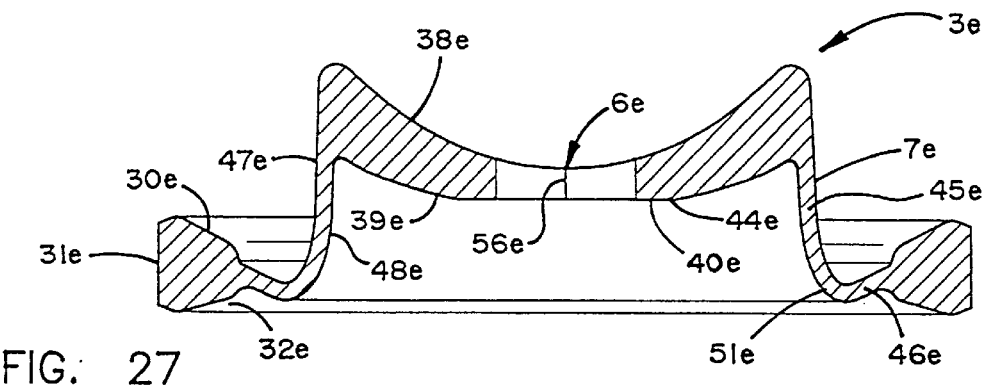
FIG. 27 is an enlarged, cross-sectional view of yet another valve embodying the present invention.
Figure 28:
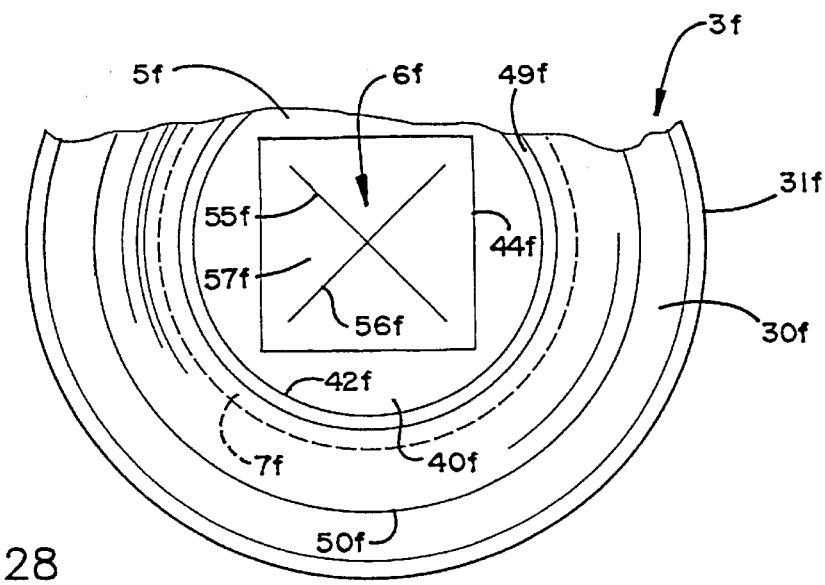
FIG. 28 is an enlarged, fragmentary, bottom plan view of yet another valve embodying the present invention.
Figure 29:
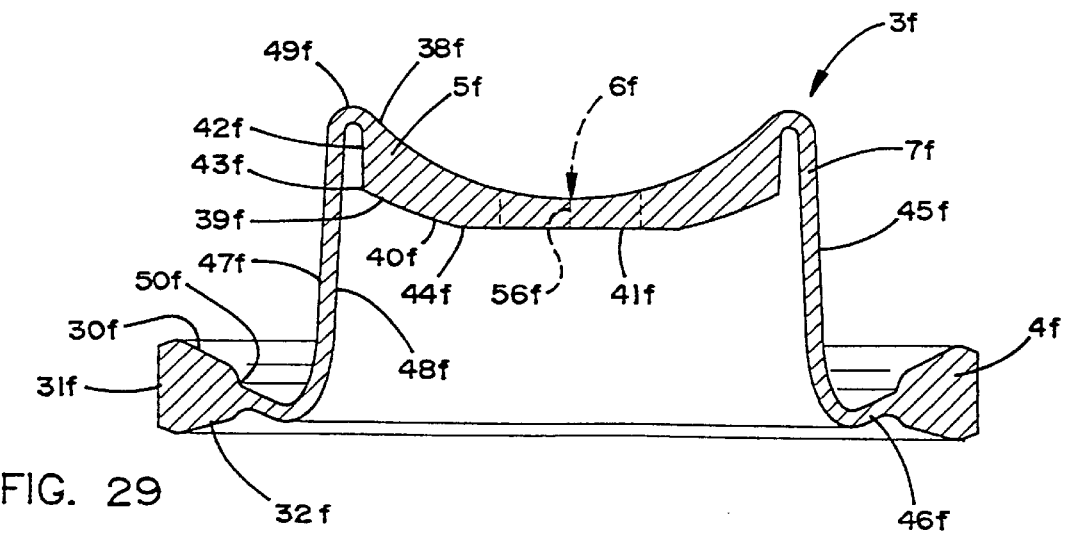
FIG. 29 is an enlarged, cross-sectional view of the valve shown in FIG. 28.

The reference numerals 3b (FIG. 24), 3c (FIG. 25), 3d (FIG. 26), 3e (FIG. 27) and 3f (FIGS. 28–29) generally designate additional alternate embodiments of the present invention, that have slightly different dispensing valve configurations. Since dispensing valves 3b–3f are similar to the previously described dispensing valves 3 and 3a, similar parts appearing in FIGS. 1–23 and 24–29 respectively are represented by the same, corresponding reference numeral, except for the suffixes "b"–"f" respectively in the reference numerals of the later.

Dispensing valves 3b–3f are each specifically designed for top dispense containers, similar to the previously described dispensing valve 3a, and operate in a similar manner. More specifically, dispensing valve 3b is similar to dispensing valve 3a, except that the interior head portion surface 40b of dispensing valve 3b is completely arcuate, and lacks the circular center portion 41a of dispensing valve 3a. The radius of interior valve head surface 40b is greater than that of the exterior valve head surface 38b, such that valve head 5b has a tapered configuration, which is thinner at discharge orifice 6b.

Dispensing valve 3c is similar to dispensing valve 3b, except that the opposite surfaces 40c and 38c of valve head 5c are parallel, and of the same radius, such that head portion 5c has a substantially uniform thickness. Dispensing valve 3d is similar to valve 3c, except that the upper end of connector sleeve 7d attaches directly to the associated head portion 5d, without the inverted J-shape 49c of valve 3c. Dispensing valve 3e is similar to valve 3a, except that the upper end of connector sleeve 7e attaches directly to head portion 5e, without the inverted J-shape 49a of valve 3a. Dispensing valve 3f is similar to valve 3a, except that the interior surface 40f of head portion 5f has a square shape adjacent orifice 6a, instead of the circular shape 44a of valve 3a.

Figure 30:
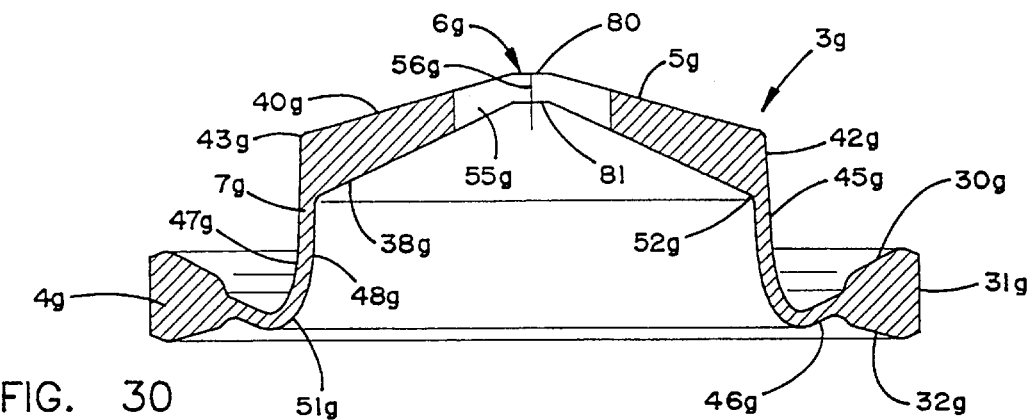
FIG. 30 is an enlarged, cross-sectional view of yet another valve embodying the present invention.
Figure 31:
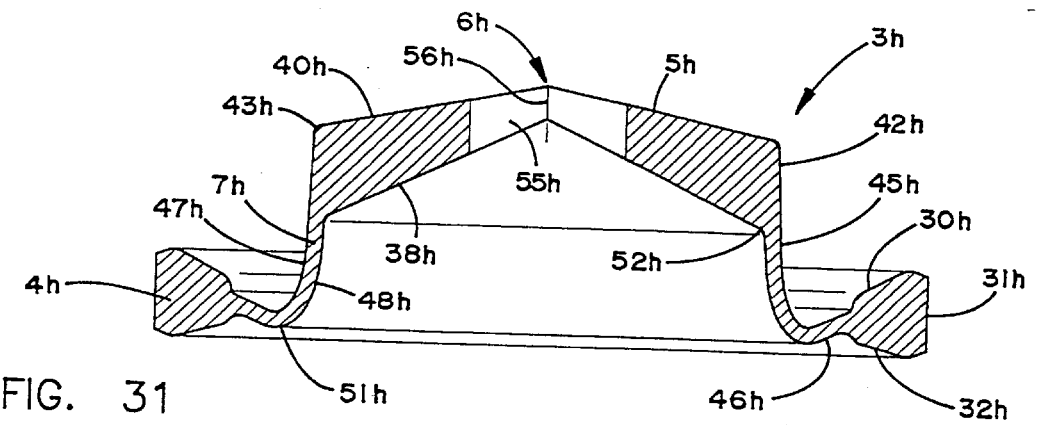
FIG. 31 is an enlarged, cross-sectional view of yet another valve embodying the present invention.
Figure 32:
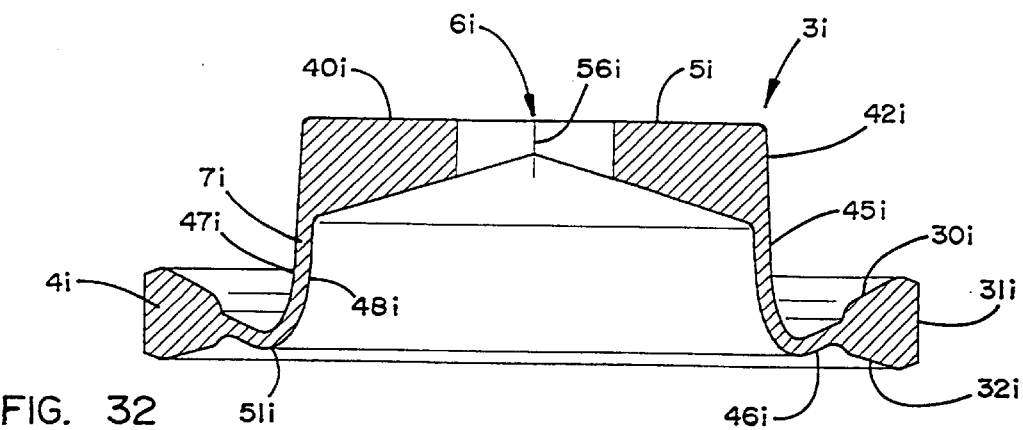
FIG. 32 is an enlarged, cross-sectional view of yet another valve embodying the present invention.

The reference numerals 3g (FIG. 30), 3h (FIG. 31) and 3i (FIG. 32) generally designate additional alternate dispensing valves embodying the present invention. Since dispensing valves 3g–3i are similar to the previously described dispensing valves 3–3f, similar parts appearing in FIGS. 30–32 are represented by the same, corresponding reference numeral, except for the suffixes "g"–"i" respectively in the reference numerals of the later. Dispensing valves 3g–3i are each specifically designed for bottom dispense packaging, similar to valve 3, and operate in a similar manner. More specifically, dispensing valve 3g is similar to previously described valve 3, except that the opposite surfaces 38g and 40g of valve head 5g are frustroconical, and taper to center circular areas 80 and 81 adjacent discharge orifice 6g. Dispensing valve 3h is similar to previously described dispensing valve 3g, except that the opposite surfaces 38h and 40h of head portion 5h intersect at discharge orifice 6h, such that they lack the circular areas 80 and 81 of dispensing valve 3g. Dispensing valve 3i is similar to previously described dispensing valve 3h, except that the exterior surface 40i of head portion 5i is flat and oriented generally perpendicular to the central axis of the valve 3i.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of an invention in which an exclusive property or privilege is claimed are defined as follows:

1. A dispensing package for fluid products, comprising:
   a container shaped to retain a selected fluid product therein, and having a discharge opening; and
   a dispensing valve for controlling the flow of the fluid product from said container, having a marginal portion sealing about the discharge opening of said container, a head portion including a central area with an orifice which opens to permit fluid flow therethrough in response to a predetermined discharge pressure within said container, and closes to shut off fluid flow therethrough upon removal of the predetermined discharge pressure, and a generally J-shaped connector sleeve having a resiliently flexible construction with a first leg portion thereof connected with said marginal portion, and a second leg portion thereof connected with said head portion; said first and second leg portions being mutually oriented at an acute included angle, and joining one another at an arcuate portion which facilitates movement of said head portion when dispensing product from said container.

2. A dispensing package as set forth in claim 1, wherein: said first leg portion of said connector sleeve is shorter than said second leg portion of said connector sleeve.

3. A dispensing package as set forth in claim 2, wherein: said connector sleeve has a substantially uniform thickness between opposite end portions thereof.

4. A dispensing package as set forth in claim 3, wherein: said head portion has an axial centerline extending through said central area thereof; and
   said second leg portion of said connector sleeve is oriented at an acute angle relative to the axial centerline of said head portion.

5. A dispensing package as set forth in claim 4, wherein: said marginal portion of said valve includes a generally flat outer edge oriented substantially parallel with the axial centerline of said head portion.

6. A dispensing package as set forth in claim 5, wherein: said first leg portion of said connector sleeve is oriented at an acute angle to the axial centerline of said head portion.

7. A dispensing package as set forth in claim 6, wherein: said arcuate portion of said connector sleeve has a quarter-circular shape.

8. A dispensing package as set forth in claim 7, wherein: said marginal portion has a generally triangular axial cross-sectional shape.

9. A dispensing package as set forth in claim 8, wherein: said marginal portions include opposite surfaces which taper inwardly from said outer edge to said first leg portion.

10. A dispensing package as set forth in claim 9, wherein: said orifice is positioned concentric with the axial centerline of said head portion.

11. A dispensing package as set forth in claim 10, wherein: said second leg portion of said connector sleeve has an inverted J-shaped end portion which extends arcuately into said head portion to further facilitate movement of said head portion when dispensing product from a top portion of said container.

12. A dispensing package as set forth in claim 11, wherein: said head portion has an outer edge disposed generally parallel with and spaced radially inwardly from an adjacent upper portion of the second leg of said connector sleeve.

13. A dispensing package as set forth in claim 1, wherein: said connector sleeve has a substantially uniform thickness between opposite end portions thereof.

14. A dispensing package as set forth in claim 1, wherein: said head portion has an axial centerline extending through said central area thereof; and
    said second leg portion of said connector sleeve is oriented at an acute angle relative to the axial centerline of said head portion.

15. A dispensing package as set forth in claim 1, wherein: said head portion has an axial centerline extending through said central area thereof; and
    said marginal portion of said valve includes a generally flat outer edge oriented substantially parallel with the axial centerline of said head portion.

16. A dispensing package as set forth in claim 1, wherein: said head portion has an axial centerline extending through said central area thereof; and
    said first leg portion of said connector sleeve is oriented at an acute angle to the axial centerline of said head portion.

17. A dispensing package as set forth in claim 1, wherein: said arcuate portion of said connector sleeve has a generally quarter-circular shape.

18. A dispensing package as set forth in claim 1, wherein: said marginal portion has a generally triangular axial cross-sectional shape.

19. A dispensing package as set forth in claim 1, wherein: said head portion has an axial centerline extending through said central area thereof; and
    said orifice is positioned concentric with the axial centerline of said head portion.

20. A dispensing package as set forth in claim 1, wherein: said second leg portion of said connector sleeve has an inverted J-shaped end portion which extends arcuately into said head portion to further facilitate movement of said head portion when dispensing product from said container.

21. A dispensing valve for fluid product packaging of the type having a container with a discharge opening therein, comprising:
    a marginal portion sealing about the discharge opening of the container, a head portion including a central area with an orifice which opens to permit fluid flow therethrough in response to a predetermined discharge pressure within the container, and closes to shut off fluid flow therethrough upon removal of the predetermined discharge pressure, and a generally J-shaped connector sleeve having a resiliently flexible construction with a first leg portion thereof connected with said marginal portion, and a second leg portion thereof connected with said head portion; said first and second leg portions being mutually oriented at an acute included angle, and joining one another at an arcuate portion which facilitates movement of said head portion when dispensing product from the container.

22. A dispensing value as set forth in claim 21, wherein:
said first leg portion of said connector sleeve is shorter than said second leg portion of said connector sleeve.

23. A dispensing value as set forth in claim 21, wherein:
said connector sleeve has a substantially uniform thickness between opposite end portions thereof.

24. A dispensing value as set forth in claim 21, wherein:
said second leg portion of said connector sleeve has an inverted J-shaped end portion which extends arcuately into said head portion to further facilitate movement of said head portion when dispensing product from said container.

25. A dispensing package for fluid products, comprising:
a container shaped to retain a selected fluid product therein, and having a discharge opening; and
a dispensing valve for controlling the flow of the fluid product from said container, having a marginal portion sealing about the discharge opening of said container, a head portion including a central area with an orifice which opens to permit fluid flow therethrough in response to a predetermined discharge pressure within said container, and closes to shut off fluid flow therethrough upon removal of the predetermined discharge pressure, and a resiliently flexible connector sleeve having a first end portion thereof connected with said marginal portion, and a second end portion thereof connected with said head portion; said second end of said connector sleeve having an inverted J-shape which extends arcuately into said head portion to facilitate movement of said head portion when dispensing product from said container.

26. A dispensing package as set forth in claim 25, wherein:
said head portion has an exterior surface which interfaces with ambient environment and has a generally concave shape when viewed from outside said container.

27. A dispensing package as set forth in claim 26, wherein:
said head portion has an interior surface which interfaces with the fluid product in said container and has a center area and a generally inclined outer portion which tapers inwardly toward said center area, such that said exterior and interior surfaces converge toward the central area of said head portion to provide a tapered construction with reduced thickness adjoining said orifice.

28. A dispensing package as set forth in claim 27, wherein:
said head portion has an outer edge disposed generally parallel with and spaced radially inwardly from an adjacent upper portion of said connector sleeve.

29. A dispensing package as set forth in claim 28, wherein:
said connector sleeve has a generally linear medial portion disposed between said first and second end portions.

30. A dispensing package as set forth in claim 29, wherein:
said medial and first end portions of said head portion collectively form a J-shape.

31. A dispensing package for fluid products, comprising:
a container shaped to retain a selected fluid product therein, and having a discharge opening; and
a dispensing valve for controlling the flow of the fluid product from said container, have a marginal portion sealing about the discharge opening of said container, and a head portion including a central area with an orifice which opens to permit fluid flow therethrough in response to a predetermined discharge pressure within said container, and closes to shut off fluid flow therethrough upon removal of the predetermined discharge pressure; said head portion having an exterior surface which interfaces with ambient environment and has a generally concave shape when viewed from outside said container, and an interior surface which interfaces with the fluid product in said container and has a center area and a generally inclined outer portion which tapers inwardly toward said center area, such that said exterior and interior surfaces converge toward the central area of said head portion to provide a tapered construction with reduced thickness adjoining said orifice.

32. A dispensing package as set forth in claim 31, wherein:
said valve includes a generally J-shaped connector sleeve having a resiliently flexible construction with a first leg portion thereof connected with said marginal portion, and a second leg portion thereof connected with said head portion; said first and second leg portions being mutually oriented at an acute included angle, and joining one another at an arcuate portion which facilitates movement of said head portion when dispensing product from said container.

33. A dispensing package as set forth in claim 32, wherein:
said first leg portion of said connector sleeve is shorter than said second leg portion of said connector sleeve.

34. A dispensing package as set forth in claim 33, wherein:
said connector sleeve has a substantially uniform thickness between opposite end portions thereof.

35. A dispensing valve for fluid packaging of the type having a container with a discharge opening therein, comprising:
a marginal portion for sealing about the discharge opening of the container, and a head portion including a central area with an orifice which opens to permit fluid flow therethrough in response to a predetermined discharge pressure within the container, and closes to shut off fluid flow therethrough upon removal of the predetermined discharge pressure; said head portion having an exterior surface which interfaces with ambient environment and has a generally concave shape when viewed from outside the container, and an interior surface which interfaces with the fluid product in the container and has a center area and a generally inclined outer portion which tapers inwardly toward said center area, such that said exterior and interior surfaces converge toward the central area of said head portion to provide a tapered construction with reduced thickness adjoining said orifice.

36. A dispensing valve as set forth in claim 35, including:
a generally J-shaped connector sleeve having a resiliently flexible construction with a first leg portion thereof connected with said marginal portion, and a second leg portion thereof connected with said head portion; said first and second leg portions being mutually oriented at an acute included angle, and joining one another at an arcuate portion which facilitates movement of said head portion when dispensing product from the container.

37. A dispensing valve as set forth in claim 36, wherein:

said first leg portion of said connector sleeve is shorter than said second leg portion of said connector sleeve.

38. A dispensing valve as set forth in claim 37, wherein:

said connector sleeve has a substantially uniform thickness between opposite end portions thereof.

39. A dispensing valve for fluid packaging of the type having a container and a discharge opening therein, comprising:

a marginal portion sealing about the discharge opening of said container, a head portion including a central area with an orifice which opens to permit fluid flow therethrough in response to a predetermined discharge pressure within the container, and closes to shut off fluid flow therethrough upon removal of the predetermined discharge pressure, and a resiliently flexible connector sleeve having a first end portion thereof connected with said marginal portion, and a second end portion thereof connected with said head portion; said second end of said connector sleeve having an inverted J-shape which extends arcuately into said head portion to facilitate movement of said head portion when dispensing product from the container.

40. A dispensing valve as set forth in claim 39, wherein:

said head portion has an exterior surface which interfaces with ambient environment and has a generally concave shape when viewed from outside said container.

41. A dispensing valve as set forth in claim 40, wherein:

said head portion has an interior surface which interfaces with the fluid product in the container and has a center area and a generally inclined outer portion which tapers inwardly toward said center area, such that said exterior and interior surfaces converge toward the central area of said head portion to provide a tapered construction with reduced thickness adjoining said orifice.

42. A dispensing valve as set forth in claim 41, wherein:

said head portion has an outer edge disposed generally parallel with and spaced radially inwardly from an adjacent upper portion of said connector sleeve.

43. A dispensing valve as set forth in claim 42, wherein:

said connector sleeve has a generally linear medial portion disposed between said first and second end portions.

44. A dispensing valve as set forth in claim 43, wherein:

said medial and first end portions of said head portion collectively form a J-shape.

\* \* \* \* \*

UNITED STATES PATENT AND TRADEMARK OFFICE
Certificate

Patent No. 5,839,614                                                                                    Patented: November 24, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Paul E. Brown, Midland MI; Timothy R. Socier, Essexville, MI.

Signed and Sealed this Nineteenth Day of September, 2000.

<div align="right">

KEVIN P. SHAVER
*Supervisory Patent Examiner,*
Art Unit 3754

</div>